US009617624B2

(12) United States Patent
Tanahashi et al.

(10) Patent No.: US 9,617,624 B2
(45) Date of Patent: Apr. 11, 2017

(54) STEEL SHEET FOR HOT STAMPING MEMBER AND METHOD OF PRODUCING SAME

(75) Inventors: Hiroyuki Tanahashi, Tokyo (JP); Jun Maki, Tokyo (JP)

(73) Assignee: NIPPON STEEL SUMITOMO METAL CORPORATION, Tokyo (JP)

( * ) Notice: Subject to any disclaimer, the term of this patent is extended or adjusted under 35 U.S.C. 154(b) by 95 days.

(21) Appl. No.: 14/112,414

(22) PCT Filed: Apr. 26, 2012

(86) PCT No.: PCT/JP2012/061238
§ 371 (c)(1),
(2), (4) Date: Oct. 17, 2013

(87) PCT Pub. No.: WO2012/147863
PCT Pub. Date: Nov. 1, 2012

(65) Prior Publication Data
US 2014/0044987 A1   Feb. 13, 2014

(30) Foreign Application Priority Data
Apr. 27, 2011 (JP) .................................. 2011-100019

(51) Int. Cl.
*B32B 15/10* (2006.01)
*C22C 38/54* (2006.01)
(Continued)

(52) U.S. Cl.
CPC ............ *C22C 38/54* (2013.01); *B21D 22/022* (2013.01); *B21D 37/16* (2013.01); *B32B 15/012* (2013.01);
(Continued)

(58) Field of Classification Search
None
See application file for complete search history.

(56) References Cited

U.S. PATENT DOCUMENTS 7,832,242 B2 * 11/2010 Brandstatter et al. ............ 72/47
7,867,344 B2 *  1/2011 Kusumi et al. ............... 148/535
(Continued)

FOREIGN PATENT DOCUMENTS

CN       1859994 A   11/2006
CN     101144162 A    3/2008
(Continued)

OTHER PUBLICATIONS

Chinese Office Action and Search Report for corresponding Chinese Application No. 201280019667.5, dated Dec. 29, 2014, with a partial English translation.
(Continued)

*Primary Examiner* — Daniel J Schleis
(74) *Attorney, Agent, or Firm* — Birch, Stewart, Kolasch & Birch, LLP

(57) ABSTRACT

A steel sheet for a hot stamping member contains, as a chemical composition, 0.10 mass % to 0.35 mass % of C; 0.01 mass % to 1.0 mass % of Si; 0.3 mass % to 2.3 mass % of Mn; 0.01 mass % to 0.5 mass % of Al; limited to 0.03 mass % or less of P; limited to 0.02 mass % or less of S; limited to 0.1 mass % or less of N; and a balance consisting of Fe and unavoidable impurities, in which a standard deviation of diameters of iron carbides which are contained in a region from a surface to a ¼ thickness position of the steel sheet is less than or equal to 0.8 μm.

18 Claims, 4 Drawing Sheets

(51) Int. Cl.
| | |
|---|---|
| B21D 22/02 | (2006.01) |
| B21D 37/16 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/28 | (2006.01) |
| C22C 38/32 | (2006.01) |
| B32B 15/01 | (2006.01) |
| C21D 8/02 | (2006.01) |
| C22C 38/22 | (2006.01) |
| C22C 38/24 | (2006.01) |
| C22C 38/26 | (2006.01) |
| C22C 38/42 | (2006.01) |
| C22C 38/50 | (2006.01) |
| C23C 2/02 | (2006.01) |
| C23C 2/06 | (2006.01) |
| C23C 2/12 | (2006.01) |
| C23C 2/28 | (2006.01) |
| C23C 2/40 | (2006.01) |
| C21D 1/673 | (2006.01) |

(52) U.S. Cl.
CPC .......... *B32B 15/013* (2013.01); *C21D 8/0247* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/50* (2013.01); *C23C 2/02* (2013.01); *C23C 2/06* (2013.01); *C23C 2/12* (2013.01); *C23C 2/28* (2013.01); *C23C 2/405* (2013.01); *C21D 1/673* (2013.01); *Y10T 428/12757* (2015.01); *Y10T 428/12799* (2015.01)

(56) References Cited

U.S. PATENT DOCUMENTS 8,066,829 B2 * 11/2011 Spehner et al. ............. 148/534

| 2004/0166360 A1 | 8/2004 | Imai et al. |
|---|---|---|
| 2007/0111022 A1 | 5/2007 | Hattori et al. |
| 2009/0025836 A1 | 1/2009 | Bello et al. |
| 2011/0048585 A1 | 3/2011 | Toki et al. |
| 2011/0165436 A1 | 7/2011 | Drillet et al. |
| 2012/0006451 A1 | 1/2012 | Abe et al. |
| 2014/0004378 A1 | 1/2014 | Tanahashi et al. |

FOREIGN PATENT DOCUMENTS

| CN | 103443317 A | 12/2013 |
|---|---|---|
| EP | 1 160 346 A1 | 12/2001 |
| EP | 2 246 456 A1 | 11/2010 |
| EP | 2 258 887 A1 | 12/2010 |
| EP | 2 312 005 A1 | 4/2011 |
| JP | 10-330876 A | 12/1998 |
| JP | 11-80884 A | 3/1999 |
| JP | 2001-220643 A | 8/2001 |
| JP | 2003-268489 A | 9/2003 |
| JP | 2005-139485 A | 6/2005 |
| JP | 2005-200670 A | 7/2005 |
| JP | 2005-205477 A | 8/2005 |
| JP | 2005-344160 A | 12/2005 |
| JP | 2005-344197 A | 12/2005 |
| JP | 2006-274348 A | 10/2006 |
| JP | 2006-291236 A | 10/2006 |
| JP | 2007-314817 A | 12/2007 |
| JP | 2007321180 * | 12/2007 |
| JP | 2008-274360 A | 11/2008 |
| JP | 2010-18860 A | 1/2010 |
| KR | 1020060090309 A | 8/2006 |
| RU | 2379373 C1 | 1/2010 |
| RU | 2395593 C1 | 7/2010 |
| TW | 201038748 A1 | 11/2010 |
| WO | WO2009090443 * | 7/2009 |
| WO | WO 2009/096351 A1 | 8/2009 |

OTHER PUBLICATIONS

Russian Decision on Grant for Russian Application No. 2013148558/02, dated Jan. 12, 2015, with an English translation.
Taiwanese Office Action for corresponding Taiwanese Application No. 101115168 dated Jan. 15, 2014 (with English translation).
PCT/ISA/210—International Search Report for PCT/JP2012/061238 dated Aug. 7, 2012.
Korean Office Action dated Mar. 9, 2015, for Korean Application No. 10-2013-7028414 with the English Translation.
Extended European Search Report for European Patent Application No. 12776563.4, dated Aug. 28, 2015.

* cited by examiner

STEEL SHEET FOR HOT STAMPING MEMBER AND METHOD OF PRODUCING SAME

TECHNICAL FIELD

The present invention relates to a steel sheet for a hot stamping member capable of being desirably used for hot stamping which is a forming method of obtaining a high-strength member; and a method of producing the same.

Priority is claimed on Japanese Patent Application No. 2011-100019, filed on Apr. 27, 2011, and the contents of which are incorporated herein by reference.

BACKGROUND ART

In the field of automobiles, construction machines, and the like, there has been intense research in how to reduce mass using a high-strength material. For example, in the automobile field, the amount of a high-strength steel sheet used has steadily increased for the purposes of suppressing an increase in the mass of a vehicle, which is required for securing collision safety and realizing high performance, and improving fuel efficiency to reduce carbon dioxide emissions.

In such an increase in the amount of a high-strength steel sheet used, the most significant problem is a phenomenon called "deterioration in shape fixability" which is inevitably caused when the strength of a steel sheet increases. "Deterioration in shape fixability" refers to the general term for a phenomenon in which the spring-back amount after forming increases along with an increase in strength; and thus, the desired shape is difficult to obtain. In order to solve a problem caused by such a phenomenon, a process (for example, restriking) which is unnecessary for a low-strength material (material having superior shape fixability or having no problem in shape fixability) may be added, or the shape of a product may be changed.

As a method of solving this problem, a hot forming method called hot stamping has attracted attention. In this hot forming method, a steel sheet (workpiece) is heated to a predetermined temperature (generally, a temperature at which the steel sheet is in the austenite phase) to reduce the strength (that is, to promote forming) and then is formed with a die at a lower temperature (for example, room temperature) than that of the workpiece. With such a forming method, a shape can be easily given to a workpiece and a rapid cooling treatment (quenching) can be performed using a difference in temperature between a workpiece and a die. Therefore, the strength of a formed product can be secured.

Regarding a steel sheet suitable for this hot stamping and a forming method thereof, several techniques are reported.

Patent Document 1 discloses a steel sheet from which a member having superior impact properties and delayed fracture resistance can be obtained after hot forming (corresponding to hot stamping) by controlling the amounts of contained elements and relationships between the amounts of elements to be in predetermined ranges.

Patent Document 2 discloses a method of obtaining a high-strength component by controlling the amounts of contained elements and relationships between the amounts of elements to be in predetermined ranges as described above; and heating a steel sheet in a nitriding atmosphere or a carburizing atmosphere before forming.

Patent Document 3 discloses means for obtaining a hot-pressed product at a high productivity by specifying chemical components and a microstructure and limiting heating conditions and forming conditions.

Recently, the utility of hot stamping has been widely recognized, and the application of hot stamping has been also discussed for various members. Such members include, for example, a long component such as a center pillar of a vehicle.

The present inventors found that a small but certain amount of deflection occurred in such a long component unlike a short component in which the deflection was negligible.

The present inventors presume the reason why the deflection occurs to be as follows: cooling conditions during hot stamping are deviated from ideal uniform conditions by an increase in the size of a component; and as a result, non-uniform strains are introduced into the component.

As a result of detailed investigation regarding the reason for such non-uniformity, the present inventors had the feeling that the non-uniformity of strains may relate to variation in the carbon concentration of a steel sheet immediately before hot stamping (immediately before forming using a die).

As a result of further study, it was found that, in a heating process immediately before forming, dissolution behaviors of iron carbides in a steel sheet are the key to suppressing the non-uniformity.

In general, a steel sheet for hot stamping includes the ferrite phase as a primary phase, pearlite and the like as a secondary phase, and a microstructure composed of iron carbides. In such a steel sheet, carbon, produced from iron carbides in the heating process before forming, is solid-soluted in the austenite phase, this austenite phase is quenched to be transformed into the martensite phase, and as a result, a high strength can be obtained. The strength of the produced martensite phase strongly depends on the cooling conditions and the concentration of carbon which is solid-soluted in the austenite phase. Therefore, it can be easily presumed that a method of uniformly dissolving iron carbides in the heating process has a strong effect on mechanical properties of a formed product obtained in the subsequent process.

Furthermore, as a result of detailed study, the present inventors found that the uniformity of the carbon concentration in the austenite phase was strongly affected not by the size (average size) of iron carbides before heating but by the size distribution thereof. However, there are no examples of investigating a steel sheet for hot stamping from this point of view.

Patent Documents 1 to 3 have no description regarding the size distribution of carbides.

Patent Documents 1 and 2 neither disclose under what conditions a cold-rolled steel sheet is annealed nor investigate the control of carbides in a steel sheet.

Patent Document 3 neither has description regarding heating history, which is most important for controlling a state of carbides during the annealing of a cold-rolled steel sheet, nor investigates the control of carbides.

Patent Document 4 discloses a technique in which a spheroidizing ratio and an average particle diameter of carbides are controlled to be in predetermined ranges, thereby obtaining a steel sheet having superior local ductility and hardenability. However, Patent Document 4 has no description regarding the size distribution of carbides.

In addition, in order to obtain a predetermined metallographic structure, extremely special annealing is necessary, and the production in a general type of continuous annealing equipment or continuous hot dip coating equipment is not considered. Therefore, in Patent Document 4, annealing conditions are not regulated to control the size distribution of carbides.

Patent Document 5 discloses a technique in which an average particle diameter of iron carbides is controlled to be in a predetermined range, thereby obtaining a steel sheet having superior strength stability to heat treatment conditions and superior delayed fracture resistance. However, Patent Document 5 has no description regarding the size distribution of carbides.

Patent Document 5 neither discloses heating history until the maximum heating temperature nor has description regarding the control of the size distribution of carbides.

Patent Document 6 discloses a technique in which an average particle diameter of ferrite and a ratio of spheroidal carbides having a predetermined size to all the spheroidal carbides are controlled to obtain a high carbon steel sheet having superior wear resistance. However, Patent Document 6 has no description regarding the size distribution of carbides.

In addition, in order to obtain a predetermined steel sheet, it is necessary that a hot-rolled steel sheet and a cold-rolled steel sheet be annealed for a long time multiple times. In addition, the production in a general type of continuous annealing equipment or continuous hot dip coating equipment is not considered. Therefore, in Patent Document 6, annealing conditions are not regulated to control the size distribution of carbides.

Patent Document 7 discloses a technique in which an average particle diameter of ferrite and an average particle diameter of carbides are controlled to obtain a medium or high carbon high-strength steel sheet having superior punching quality. However, Patent Document 7 has no description regarding the size distribution of carbides.

In addition, Patent Document 7 discloses a cold-rolled steel sheet in the as-cold-rolled state; and a cold-rolled steel sheet which is annealed under annealing conditions of a low temperature of 350° C. to 700° C. and a long time of 10 hours to 40 hours. In addition, the production in a general type of continuous annealing equipment or continuous hot dip coating equipment is not considered. Therefore, in Patent Document 7, annealing conditions are not regulated to control the size distribution of carbides.

As a result of study, the present inventors found that the size distribution of iron carbides had a close relationship with a change in the rise rate of a steel sheet temperature during the annealing of a cold-rolled steel sheet. However, there are no examples of investigating a method of producing a steel sheet for hot stamping from this point of view.

PRIOR ART DOCUMENT

Patent Document

[Patent Document 1] Japanese Unexamined Patent Application, First Publication No. 2005-139485
[Patent Document 2] Japanese Unexamined Patent Application, First Publication No. 2005-200670
[Patent Document 3] Japanese Unexamined Patent Application, First Publication No. 2005-205477
[Patent Document 4] Japanese Unexamined Patent Application, First Publication No. H11-80884
[Patent Document 5] Japanese Unexamined Patent Application, First Publication No. 2003-268489
[Patent Document 6] Japanese Unexamined Patent Application, First Publication No. 2006-274348
[Patent Document 7] Japanese Unexamined Patent Application, First Publication No. 2006-291236

DISCLOSURE OF THE INVENTION

Problem that the Invention is to Solve

In consideration of the above-described circumstances, the present invention is to provide a steel sheet for a hot stamping member in which a size distribution of iron carbides in the steel sheet is controlled so as to reduce a deflection which easily occurs when a long component is manufactured by hot stamping; and a method of producing the same.

Means for Solving the Problems

In order to solve the above-described problems, the present inventors have thoroughly studied. As a result, it was found that, when a diameter distribution of iron carbides which were contained in a region from a surface to a ¼ thickness position of a steel sheet was in a predetermined range, the deflection of a formed component can be significantly effectively suppressed regardless of a variation in cooling conditions during forming. In addition, it was found that such a steel sheet can be obtained by controlling conditions when a cold-rolled steel sheet was annealed for recrystallization, thereby completing the present invention after trial and error.

The summary thereof is as follows.

(1) According to an aspect of the invention, there is provided a steel sheet for a hot stamping member, the steel sheet including, as a chemical composition, 0.10 mass % to 0.35 mass % of C; 0.01 mass % to 1.0 mass % of Si; 0.3 mass % to 2.3 mass % of Mn; 0.01 mass % to 0.5 mass % of Al; limited to 0.03 mass % or less of P; limited to 0.02 mass % or less of S; limited to 0.1 mass % or less of N; and a balance consisting of Fe and unavoidable impurities, in which a standard deviation of diameters of iron carbides which are contained in a region from a surface to a ¼ thickness position of the steel sheet is less than or equal to 0.8 μm.

(2) In the steel sheet for a hot stamping member according to (1), the chemical composition may further contain one or more selected from the group consisting of 0.01 mass % to 2.0 mass % of Cr; 0.001 mass % to 0.5 mass % of Ti; 0.001 mass % to 0.5 mass % of Nb; 0.0005 mass % to 0.01 mass % of B; 0.01 mass % to 1.0 mass % of Mo; 0.01 mass % to 0.5 mass % of W; 0.01 mass % to 0.5 mass % of V; 0.01 mass % to 1.0 mass % of Cu; and 0.01 mass % to 5.0 mass % of Ni.

(3) In the steel sheet for a hot stamping member according to (1) or (2), an Al plating layer having a plating thickness of 50 μm or less may be formed on the surface.

(4) In the steel sheet for a hot stamping member according to (1) or (2), a Zn plating layer having a plating thickness of 30 μm or less may be formed on the surface.

(5) In the steel sheet for a hot stamping member according to (1) or (2), a Zn—Fe alloy layer having a plating thickness of 45 μm or less may be formed on the surface.

(6) According to another aspect of the invention, there is provided a method of producing a steel sheet for a hot stamping member, the method including: performing a recrystallization annealing process in which a cold-rolled steel sheet is heated such that a change d/dt ($\Delta T/\Delta t$; ° C./s$^2$) in a rise rate of a steel sheet temperature from 300° C. to a maximum temperature S satisfies following expression 1 and such that the maximum temperature S is 720° C. to 820°

C., wherein T represents the steel sheet temperature (° C.), t represents time (second), and ΔT/Δt represents the rise rate (° C./s) of the steel sheet temperature for a time Δt (second) during the heating of the recrystallization annealing process, and wherein the cold-rolled steel sheet contains, as a chemical composition, 0.10 mass % to 0.35 mass % of C; 0.01 mass % to 1.0 mass % of Si; 0.3 mass % to 2.3 mass % of Mn; 0.01 mass % to 0.5 mass % of Al; limited to 0.03 mass % or less of P; limited to 0.02 mass % or less of S; limited to 0.1 mass % or less of N; and a balance consisting of Fe and unavoidable impurities.

$$-0.205 d/dt(\Delta T/\Delta t)<0 \quad \text{(Expression 1)}$$

(7) In the method of producing a steel sheet for a hot stamping member according to (6), the chemical composition may further contain one or more selected from the group consisting of 0.01 mass % to 2.0 mass % of Cr; 0.001 mass % to 0.5 mass % of Ti; 0.001 mass % to 0.5 mass % of Nb; 0.0005 mass % to 0.01 mass % of B; 0.01 mass % to 1.0 mass % of Mo; 0.01 mass % to 0.5 mass % of W; 0.01 mass % to 0.5 mass % of V; 0.01 mass % to 1.0 mass % of Cu; and 0.01 mass % to 5.0 mass % of Ni.

(8) In the method of producing a steel sheet for a hot stamping member according to (6) or (7), the change d/dt (ΔT/Δt) may be two times a coefficient of a variable of the second degree when a temperature is read at a time interval of 10 seconds or shorter from a temperature history during the heating of the recrystallization annealing process and then a polynomial approximation curve of the second degree is determined such that a coefficient of determination $R^2$ is greater than or equal to 0.99.

(9) The method of producing a steel sheet for a hot stamping member according to any one of (6) to (8), after the recrystallization annealing process, may further include dipping the cold-rolled steel sheet in an Al bath to form an Al plating layer on a surface of the cold-rolled steel sheet.

(10) The method of producing a steel sheet for a hot stamping member according to any one of (6) to (8), after the recrystallization annealing process, may further include dipping the cold-rolled steel sheet in a Zn bath to form a Zn plating layer on a surface of the cold-rolled steel sheet.

(11) The method of producing a steel sheet for a hot stamping member according to any one of (6) to (8), after the recrystallization annealing process, may further include dipping the cold-rolled steel sheet in a Zn bath to form a Zn plating layer on a surface of the cold-rolled steel sheet; and heating the cold-rolled steel sheet to 600° C. or lower to form a Zn—Fe alloy layer on a surface of the cold-rolled steel sheet.

Advantage of the Invention

With the steel sheet for a hot stamping member according to the aspect, the deflection of a long formed product which is formed in a widely-known type of hot stamping equipment is extremely small. Therefore, when this formed product is joined with another component, there is a low possibility of defects. For the above-described reason, the steel sheet for a hot stamping member according to the aspect has an effect of increasing an application range (component) of hot stamping.

In addition, with the steel sheet for a hot stamping member according to (3) to (5), the Al plating layer, the Zn Plating layer, and the Zn—Fe alloy layer which have small defects such as galling, peeling, and cracking after hot stamping can be obtained. Therefore, in this case, the corrosion resistance and surface quality of the steel sheet for a hot stamping member can be further improved.

Furthermore, in the method of producing a steel sheet for a hot stamping member according to the aspect, the existing iron-making equipment can be used. In addition, even when a long formed product is manufactured by hot stamping, a steel sheet for a hot stamping member capable of significantly reducing deflection can be provided.

Furthermore, in the method of producing a steel sheet for a hot stamping member according to (9) to (11), the corrosion resistance and surface quality of the steel sheet for a hot stamping member can be further improved.

EMBODIMENTS OF THE INVENTION

Figure 1A:
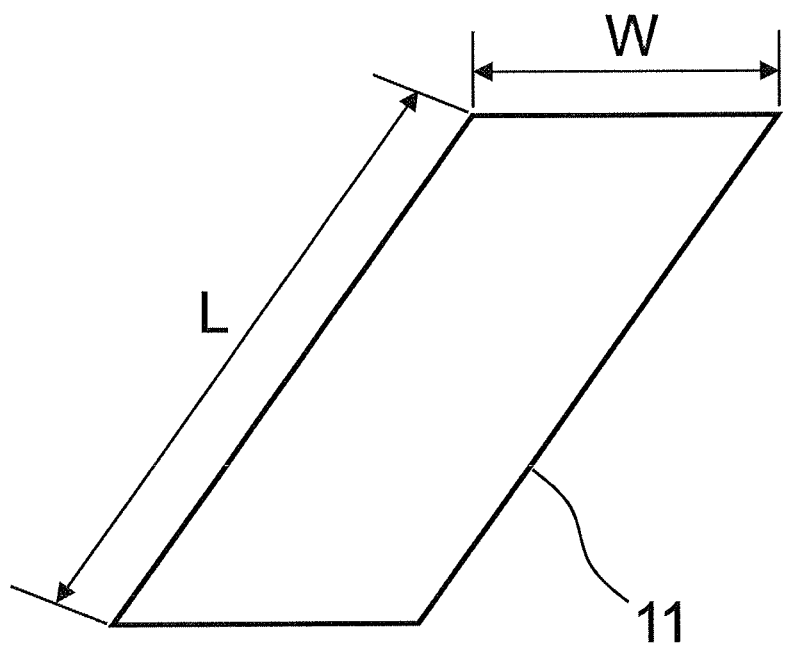
FIG. 1A is a perspective view illustrating a blank (steel sheet) before being formed into a shape steel using hot stamping.

The present inventors prepared a hot stamping member using a steel sheet containing C: 0.22 mass %, Si: 0.3 mass %, and Mn: 1.2 mass %, and performed study for evaluating properties thereof. The present inventors investigated actual conditions of deflection in detail particularly in consideration of the application to a long component. During the investigation, it was found that, even when steel sheets having substantially the same chemical components and tensile strength were hot-stamped under the same conditions, there was a difference between deflection sizes of formed products. Therefore, as a result of detailed investigation regarding the reason why there was a difference in deflection size between the steel sheets, the present inventors found that: (i) there was a difference between variations in the hardness of portions near surfaces of the formed products as compared the steel sheets to each other; (ii) this difference was caused by a size distribution of iron carbides in a portion near a surface of a steel sheet before hot stamping; and (iii) in order to obtain the desired size distribution of iron carbides, it was preferable that recrystallization annealing conditions of a cold-rolled steel sheet be controlled in a predetermined range.

Although the details thereof will be described in Examples, the present inventors experimentally found out an appropriate size distribution of iron carbides and appropriate annealing conditions based on these experimental results, thereby completing the invention.

Hereinafter, a steel sheet for a hot stamping member (steel sheet) according to an embodiment of the invention will be described.

First, chemical components of the steel sheet will be described. Hereinafter, "%" of each chemical component represents "mass %".

<C: 0.10% to 0.35%>

C is the most important element from the viewpoint of increasing the strength of the steel sheet using hot stamping. In order to obtain a strength of at least approximately 1200 MPa after hot stamping, a C content in the steel is controlled to be greater than or equal to 0.10%. On the other hand, when the C content in the steel is greater than 0.35%, there is a concern about deterioration in toughness. Therefore, an upper limit of the C content is set to 0.35%. In order to further improve toughness, the C content is preferably less than or equal to 0.32% and more preferably less than or equal to 0.30%.

<Si: 0.01% to 1.0%>

Si is a solute strengthening element, and 0.01% to 1.0% of Si can be effectively used as a solute strengthening element. However, when Si content in the steel is greater than 1.0%, there is a concern that defects may be caused during chemical conversion coating or coating after hot stamping. Therefore, an upper limit of the Si content is set to 1.0%. A lower limit of the Si content is not particularly limited, and an effect of controlling iron carbides can be obtained regardless of the lower limit. However, when the Si content is reduced more than necessary, a steelmaking load increases. Therefore, the Si content is controlled to be greater than or equal to 0.01%. A lower limit of the Si content is a reference value of Si which is contained in the steel due to deoxidation. In order to perform a more stable surface treatment, the Si content is preferably less than or equal to 0.9% and more preferably less than or equal to 0.8%.

<Mn: 0.3% to 2.3%>

Like Si, Mn functions as a solute strengthening element and is also an effective element for increasing the hardenability of the steel sheet. In order to reliably obtain the effects of improving the strength and the hardenability, the Mn content in the steel is controlled to be greater than or equal to 0.3%. However, when the Mn content in the steel is greater than 2.3%, the effects are saturated. Therefore, an upper limit of the Mn content is set to 2.3%. In order to further increase the strength, the Mn content is preferably greater than or equal to 0.5% and more preferably greater than or equal to 1.0%.

<P: 0.03% or Less>, <S: 0.02% or Less>

Both elements are impurities and have an adverse effect on hot workability. Therefore P is limited to be less than or equal to 0.03%, and S is limited to be less than or equal to 0.02%.

<Al: 0.01% to 0.5%>

Since Al is preferable as a deoxidation element, an Al content in the steel may be greater than or equal to 0.01%. However, when a large amount of Al is contained in the steel, rough oxides are formed and thus, mechanical properties of the steel sheet deteriorate. Therefore, an upper limit of the Al content is set to 0.5%.

<N: 0.1% or Less>

Since N is easily bonded with Ti and B, an N content is controlled to be less than or equal to 0.1% such that the desired effects of Ti and B are not reduced. In order to increase toughness, it is preferable that the N content be small, for example, preferably less than or equal to 0.01%. When the N content is reduced more than necessary, an enormous load is applied to the steelmaking process. Therefore, a reference value of a lower limit of the N content may be set to 0.0010%.

The above-described chemical elements are basic components (basic elements) of the steel according to the embodiment. A chemical composition in which the basic elements are controlled (contained or limited); and a balance thereof is iron and unavoidable impurities, is a basic composition according to the embodiment. However, in addition to this basic components (instead of a part of Fe of the balance), the steel according to the embodiment may further optionally contain the following chemical elements (optional elements). Even when these optional elements are unavoidably (for example, the content of each optional element is less than the lower limit) incorporated into the steel, the effects of the embodiment do not deteriorate.

That is, optionally, the steel according to the embodiment may further contain one or more optional elements selected from the group consisting of Cr, Ti, Nb, B, Mo, W, V, Cu, and Ni. In order to reduce an alloy cost, it is not necessary that these optional elements be intentionally added to the steel, and all the lower limits of contents of Cr, Ti, Nb, B, Mo, W, V, Cu, and Ni are 0%.

<Cr: 0.01% to 2.0%>

Cr is an element having an effect of increasing hardenability and thus is appropriately used. In order to reliably obtain the effect, a Cr content is controlled to be greater than or equal to 0.01%. On the other hand, even when Cr having a content of 2.0% or greater is added to the steel, the effect is saturated. Therefore, an upper limit of the Cr content is set to 2.0%.

<Ti: 0.001% to 0.5%>

Ti serves to stably bring about an effect of B (described below) through nitride formation and thus is a useful element. In order to reliably obtain this effect, a Ti content is preferably greater than or equal to 0.001%. On the other hand, when Ti is excessively added to the steel, nitrides are excessively formed, and toughness and shear surface properties deteriorate. Therefore, an upper limit of the Ti content is set to 0.5%.

<Nb: 0.001% to 0.5%>

Nb forms carbonitrides, increases the strength of steel, and thus is a useful element. In order to reliably obtain the effect of increasing the strength, an Nb content in the steel is preferably greater than or equal to 0.001%. However, when Nb having a content of greater than 0.5% is contained in the steel, there is a concern that the controllability of hot rolling may deteriorate. Therefore, an upper limit of the Nb content is set to 0.5%.

<B: 0.0005% to 0.01%>

B is an element which increases hardenability. When a B content in the steel is greater than or equal to 0.0005%, the effect of increasing hardenability can be reliably obtained. On the other hand, the excessive addition of B leads to deterioration in hot workability and deterioration in ductility. Therefore, an upper limit of the B content is set to 0.01%.

<Mo: 0.01% to 1.0%>, <W: 0.01% to 0.5%>, <V: 0.01% to 0.5%>

These elements are elements having an effect of increasing hardenability and thus can be appropriately used. In order to reliably obtain the effect, a content of each element is controlled to be greater than or equal to 0.01%. On the other hand, since Mo, W, and V are expensive elements, it is preferable that a concentration at which the effect is saturated be set as an upper limit. It is preferable that the upper limit of the Mo content be 1.0%; and the upper limits of the W content and the V content be 0.5%.

<Cu: 0.01% to 1.0%>

Cu has an effect of increasing the strength of the steel sheet by adding Cu having a content of 0.01% or greater to the steel. On the other hand, since the excessive addition of Cu leads to deterioration in the surface quality of a hot-rolled steel sheet, an upper limit of the Cu content is set to 1.0%. Therefore, the Cu content may be 0.01% to 1.0%.

<Ni: 0.01% to 5.0%>

Ni has an effect of increasing hardenability and thus is a useful element. When an Ni content is greater than or equal to 0.01%, the effect is reliably obtained. On the other hand, since Ni is an expensive element, an upper limit of the Ni content is set to 5.0% at which the effect is saturated. Therefore, the Ni content may be 0.01% to 5.0%. In addition, since Ni serves to suppress the deterioration in the surface quality of a hot-rolled steel sheet caused by Cu, it is preferable that Ni be contained along with Cu.

In the embodiment, a component other than the above-described components is Fe. Unavoidable impurities which are incorporated from a dissolving raw material such as scrap, a refractory, and the like are allowed as the component other than the above-described components.

As described above, the steel sheet according to the embodiment has the chemical composition which contains the above-described basic elements and the balance consisting of Fe and unavoidable impurities; or the chemical composition which contains the above-described basic elements, at least one selected from the group consisting of the above-described optional elements, and the balance consisting of Fe and unavoidable impurities.

<Standard Deviation of Diameters of Iron Carbides Included in Region from Surface to ¼ Thickness Position: 0.8 μm or Less>

The size distribution of iron carbides is the most important factor in the embodiment.

According to the study by the present inventors, it was found that the size of deflection, which is observed in a long component formed using hot stamping, strongly depended on the variation in the hardness of a portion near a surface of the steel sheet; and the variation in carbon concentration before hot stamping. Furthermore, it was found that, when the sizes of iron carbides were more uniform, the variation in carbon concentration can be reduced.

The higher the uniformity degree of the sizes of iron carbides, the higher the uniformity degree of the dissolution behaviors of iron carbides in the heating process before hot stamping. Therefore, the carbon concentration in the austenite phase is more easily made to be uniform. As a result, the variation in hardness is reduced, and the deflection of a member is also presumed to be reduced.

A relationship between the deflection size and the variation in hardness is not entirely clear. However, presumably, this relationship is considered to have a relationship with the following mechanism. That is, among controlling factors (supersaturation degree of carbon, dislocation density, refinement degree of an organization unit (for example, a lath or a block), and a state of reprecipitated iron carbides) of the hardness of the martensite phase produced by quenching, particularly when there is a variation in the dislocation density of a portion near a surface of a component, a non-uniform residual stress is easily induced in the component. In this case, when it is attempted that a non-uniform residual stress is released after releasing the component from a hot stamping die, deflection occurs.

The deflection of a formed product which is formed using hot stamping is defined as follows.

Figure 1B:
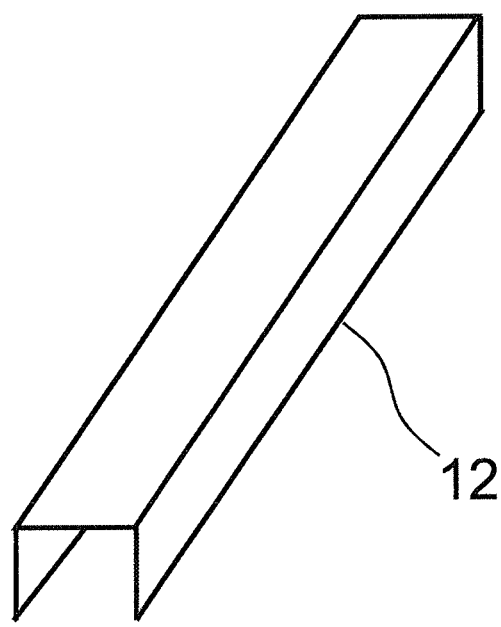
FIG. 1B is a perspective view illustrating a shape steel after forming using hot stamping.
Figure 2:
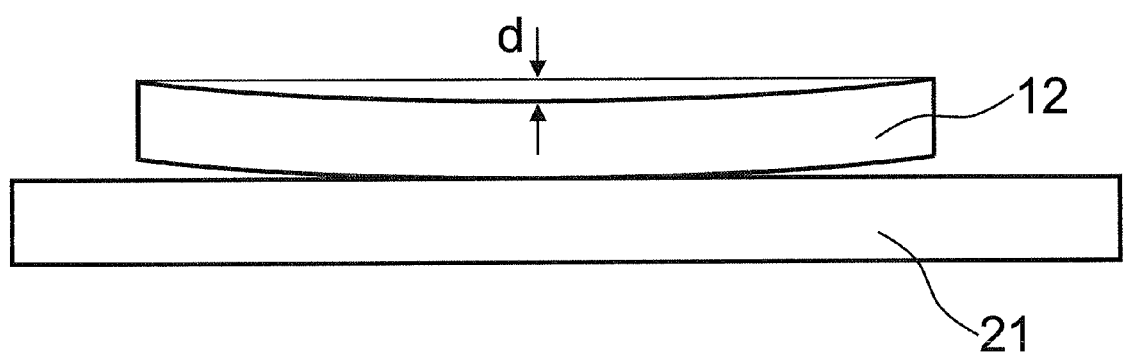
FIG. 2 is a side view illustrating a method of measuring the deflection of a long component.

That is, with a method schematically illustrated in FIGS. 1A and 1B, a blank 11 is formed into a shape steel 12, and the shape steel 12 is released from a die. Then, as illustrated in FIG. 2, the shape steel 12 is made to stand on a surface plate 21. When this shape steel 12 is seen from the width direction (in a side view), a distance d (mm) from a line connecting both ends of the shape steel 12 in the longitudinal direction to the center of the shape steel 12 in the longitudinal direction is defined as a deflection of the shape steel 12.

In this case, regarding the size of the steel sheet (blank) 11 before hot stamping, the width W is 170 mm and the length L is 1000 mm. From the steel sheet 11, the equilateral shape steel 12 with a base having a size of approximately 70 mm is obtained. When the deflection d is less than or equal to 5 mm, it is evaluated that the deflection is suppressed.

The above-described formed product (shape steel 12) is merely an example of a formed product which is prepared for evaluating the deflection d when the steel sheet according to the embodiment is formed. The steel sheet according to the embodiment can be applied to various shapes of formed products under various hot stamping conditions.

The deflection of a formed product is reduced when the length of the formed product is shorter than 1000 mm or when the width of the formed product is longer than 170 mm. When the steel sheet according to the embodiment is applied to such a formed product, an effect of further suppressing the deflection d of the formed product can be obtained.

In the embodiment, a standard deviation of diameters of iron carbides, which are contained in a region from a surface to a ¼ thickness position (position which is distant from the surface of the steel sheet by ¼ of the thickness in the through-thickness direction) of the steel sheet, is controlled to be less than or equal to 0.8 μm. When this standard deviation is greater than 0.8 μm, the deflection d of a formed product is greater than 5 mm, and it is determined that the deflection is not tolerable.

The size distribution of iron carbides is measured as follows.

That is, first, a section parallel to a rolling direction of the steel sheet (section including the through-thickness direction) is polished and is appropriately treated with a carbide emerging etchant (for example, a picral etchant). Then, using a scanning electron microscope, a section range from a surface to a ¼ thickness position of the steel sheet is continuously observed at a magnification of 5000 times. The microscopic field is widened until the number of iron carbides measured is at least 600. As the size (diameter) of an iron carbide, the average size of the longest side and the shortest side of the iron carbide is used. Based on the obtained size data of iron carbides, a standard deviation is calculated. In order to calculate the standard deviation, a commercially available statistical software can be used. With such a measurement method, iron carbides having a size of approximately 0.1 μm or greater are measured. Accordingly, the average size of iron carbides may be greater than or equal to 0.5 μm or greater than or equal to 1 μm. When the standard deviation of diameters of iron carbides is less than or equal to 0.8 μm, the average size of iron carbides is not particularly limited, but may be, for example, less than or equal to 5 μm or less than or equal to 3 μm.

The thicknesses (plating thicknesses) of an Al plating layer, a Zn plating layer, and a Zn—Fe alloy layer have no effect on the deflection of a component after hot stamping.

However, when these thicknesses are excessively large, there is a concern that they may have an effect on formability. As described below in Examples, when the thickness of an Al plating layer is larger than 50 μm, galling occurs; when the thickness of a Zn plating layer is larger than 30 μm, Zn frequently adheres to a die; and when the thickness of a Zn—Fe alloy layer is larger than 45 μm, cracks are observed on many portions of the alloy layer. In this way, when the thickness of each layer is excessively large, the productivity deteriorates. Therefore, regarding the thicknesses of these layers, the thickness of an Al plating layer may be limited to be less than or equal to 50 the thickness of a Zn plating layer may be limited to be less than or equal to 30 μm, and the thickness of a Zn—Fe alloy layer may be limited to be less than or equal to 45 μm.

When these layers are thin, there are no problems regarding formability. However, from the viewpoint of corrosion resistance which is the purpose of forming these layers, a lower limit of the thickness of each layer may be set as follows. That is, the thickness of an Al plating layer is preferably larger than or equal to 5 μm and more preferably larger than or equal to 10 μm. In addition, the thickness of a Zn plating layer is preferably larger than or equal to 5 μm and more preferably larger than or equal to 10 μm. The thickness of a Zn—Fe alloy layer is preferably larger than or equal to 10 μm and more preferably larger than or equal to 15 μm.

In the steel sheet having a surface on which one of an Al plating layer, a Zn plating layer, and a Zn—Fe alloy layer is formed, "surface" is defined as follows.

First, an Al plating layer of the steel sheet according to the embodiment includes two layers of an outside layer which contains Al as a major component; and an inside layer (steel sheet side layer) which is considered to be formed by reaction of Al and Fe. A boundary between this inside layer and the steel sheet (plated steel sheet) is defined as the surface of the steel sheet.

Next, a Zn plating layer of the steel sheet according to the embodiment includes two layers of an outside layer which contains Zn as a major component; and an inside layer (steel sheet side layer) which is formed by reaction of Fe and a small amount of Al added into a Zn bath. A boundary between this inside layer and the steel sheet (plated steel sheet) is defined as the surface of the steel sheet.

In addition, a Zn—Fe alloy layer of the steel sheet according to the embodiment includes multiple alloy layers which contain Zn and Fe. A boundary between the innermost side layer (steel sheet side layer) among these multiple alloy layers and the steel sheet (plated steel sheet) is defined as the surface of the steel sheet.

Finally, a method of producing a steel sheet for a hot stamping member according to an embodiment of the invention will be described.

In the method of producing the steel sheet according to the embodiment, steelmaking, casting, hot rolling, and cold rolling are performed with an ordinary method, thereby obtaining a cold-rolled steel sheet. In the steelmaking process, chemical components of steel are controlled so as to satisfy the chemical composition according to the above-described embodiment, and the obtained steel is used as a slab for continuous casting. The hot-rolling of the obtained slab (steel) starts, for example, at a heating temperature of 1300° C. or lower (for example, 1000° C. to 1300° C.) and ends at around 900° C. (for example, 850° C. to 950° C.). The coiling temperature can be set to around 600° C. (for example, 450° C. to 800° C.). The hot rolling reduction may be set to be 60% to 90%. A hot-rolled steel sheet (steel) obtained after coiling is cold-rolled through a pickling process. The cold rolling reduction may be set to be 30% to 90%.

Annealing for recrystallizing a cold-rolled steel sheet produced as above is extremely important. Using continuous annealing equipment, annealing is performed such that a change $d/dt\,(\Delta T/\Delta t)$ in a rise rate of a steel sheet temperature (sheet temperature) from 300° C. to a maximum temperature S (° C.) satisfies following expression 1 and such that the maximum temperature S is 720° C. to 820° C.

$$-0.2 \leq d/dt(\Delta T/\Delta t) < 0 \qquad \text{(Expression 1)}$$

In this expression, T represents the steel sheet temperature (° C.), t represents time (second), $\Delta T/\Delta t$ represents the change (° C./s) in the temperature of the steel sheet temperature for a time $\Delta t$ (second) during the heating of the recrystallization annealing process, and $d/dt\,(\Delta T/\Delta t)$ represents the change (° C./s$^2$) in the rise rate of the steel sheet temperature from 300° C. to the maximum temperature S. A criterion based on which t is 0 (zero) is not particularly limited and, for example, may be a time when an heating start time of the recrystallization annealing process or a time when the temperature reaches 300° C. due to the heating of the recrystallization annealing process.

These conditions are determined based on experimental results described below in Examples.

The steel sheet temperature during annealing is measured using a radiation thermometer provided in annealing equipment in advance or a thermocouple provided in the steel sheet. A temperature history of the steel sheet obtained as above is expressed by a quadratic function of time, and a second differential coefficient of this quadratic function is determined as $d/dt\,(\Delta T/\Delta t)$. This quadratic function is obtained with a method in which a steel sheet temperature is read at a short time interval (10 seconds or shorter, or preferably 5 seconds or shorter) from the above-described temperature history to prepare a data set (t,T); a graph is generated from this data set using (again) a commercially available spreadsheet software; and this graph is approximated by a polynomial of the second degree.

When a cold-rolled steel sheet is annealed for recrystallization under these conditions, a steel sheet in which a standard deviation of diameters of iron carbides which are contained in a region from a surface to a ¼ thickness position of the steel sheet is less than or equal to 0.8 μm is obtained. However, the reason for this is not clear. For example, in an annealing process in which a rise rate of a steel sheet temperature is gradually reduced, it is presumed that the progress of recrystallization and the dissolution of initial iron carbides are well-balanced; and thus, the uniformity of a distribution of iron carbides in the annealed steel sheet is increased.

Heating conditions from room temperature to 300° C. are not particularly limited.

After the steel sheet temperature reaches the temperature S, the steel sheet may be held at the temperature S for a short period of time, or may proceed to a cooling process immediately. When the steel sheet is held at the temperature S, the holding time is preferably shorter than or equal to 180 seconds, and more preferably shorter than or equal to 120 seconds from the viewpoint of suppressing grain coarsening.

A cooling rate from the temperature S is not particularly limited, but it is preferable that rapid cooling in which an average cooling rate is higher than or equal to 30° C./s be avoided. Most of steel sheets for hot stamping are provided for hot stamping after being sheared into a predetermined shape. Therefore, when rapid cooling is performed after annealing, a shearing load increases and thus, there is a concern that the production efficiency may decreases.

The steel sheet may cooled to room temperature after annealing, or may be dipped in a molten Al bath while being cooled to form an Al plating layer on a surface of the steel sheet.

The molten Al bath may contain 0.1% to 20% of Si.

Si contained in the Al plating layer has an effect on a reaction of Al and Fe which is caused before hot stamping and during heating. An excessive reaction may impair the press formability of the plating layer. On the other hand, an excessive suppression of the reaction may lead to the attachment of Al onto a press die. In order to avoid such problems, a Si content in the Al plating layer is preferably 1% to 15%, and more preferably 3% to 12%.

In addition, during cooling and after annealing, the steel sheet may be dipped in a molten Zn bath to form a Zn plating layer on a surface of the steel sheet.

Furthermore, the steel sheet may be dipped in a molten Zn bath to form a Zn plating layer on a surface of the steel sheet, and the steel sheet on which the Zn plating layer is formed may be heated to 600° C. or lower to form a Zn—Fe alloy layer on the surface of the steel sheet. A lower limit of an alloying temperature is not particularly limited, and may be, for example, 450° C.

The molten Zn bath can contain 0.01% to 3% of Al.

Al in the molten Zn bath has a strong effect on a reaction of Zn and Fe. When a Zn plating layer is formed, interdiffusion between Zn and Fe can be suppressed due to an interference of a reaction layer of Fe and Al. On the other hand, when a Zn—Fe alloy layer is formed, Al can be used for controlling a target layer to be a primary layer among multiple layers having different properties such as workability and adhesion with steel.

These effects can be developed when the molten Zn bath contains 0.01% to 3% of Al. An Al concentration can be selected by the manufacturer according to the capability of manufacturing equipment and the purpose.

Like the above-described embodiment, in this embodiment, the thicknesses (plating thicknesses) of an Al plating layer, a Zn plating layer, and a Zn—Fe alloy layer may be controlled to be less than or equal to a predetermined thickness. That is, it is preferable that the plating thickness of an Al plating layer be less than or equal to 50 μm; the plating thickness of a Zn plating layer be less than or equal to 30 μm; and the plating thickness of a Zn—Fe alloy layer be less than or equal to 45 μm.

The steel sheet for a hot stamping member according to the invention has the effects of the invention irrespective of the plate thickness thereof and the strength after hot stamping. However, it is preferable that the steel sheet be handled as band steel from the viewpoint of securing high productivity in the respective processes of hot rolling, cold rolling, annealing, and plating (forming a plating layer). Accordingly, the preferable plate thickness of the target steel sheet is approximately 0.5 mm to 3.5 mm. In addition, in order to further reduce the weight of a member through high-strengthening, the preferable strength of the target steel sheet after hot stamping is approximately 1200 MPa to 2000 MPa in terms of tensile strength.

Hereinafter, the effects of the invention will be described based on examples.

Example 1

Steel pieces (steels) having chemical components as shown in Table 1 were obtained through steelmaking and casting. These steels were subjected to hot rolling, in which heating was performed to 1250° C. and a finish temperature was 910° C., and were coiled at a coiling temperature of 620° C. As a result, hot-rolled steel sheets having a thickness of 3.2 mm were obtained. These hot-rolled steel sheets were pickled and were cold-rolled. As a result, cold-rolled steel sheets having a thickness of 1.6 mm were obtained.

The above-described cold-rolled steel sheets were annealed for recrystallization under conditions shown in Table 2 to obtain steel sheets for hot stamping.

Under the condition x, a cold-rolled steel sheet was heated from 300° C. to 600° C. at a constant heating rate of 10° C./s and then was heated to 800° C. at a constant heating rate of 2° C./s. In this case, in both temperature ranges of from 300° C. to 600° C. and from 600° C. to 800° C., changes d/dt ($\Delta T/\Delta t$) in the rise rate of a steel sheet temperature were 0 (zero), respectively. Under the other conditions, in a range from 300° C. to the temperature S, a cold-rolled steel sheet was heated such that a change d/dt ($\Delta T/\Delta t$) in the rise rate of a steel sheet temperature was constant. A method of obtaining this d/dt ($\Delta T/\Delta t$) will be described detail in Example 3.

A sample was collected from the steel sheet for hot stamping, a section parallel to a rolling direction of the sample was polished, and a microstructure of the section was caused to emerge using a picral etchant. Then, using a scanning electron microscope, a region from a surface of the cold-rolled steel sheet (sample) to a position which is distant from the surface of the steel sheet by 0.4 mm in the thickness direction (a ¼ thickness position of the steel sheet) was observed at a magnification of 5000 times to measure the sizes of iron carbides. This observation was performed until the number of iron carbides measured was more than or equal to 600. Then, the measured data was processed to obtain a standard deviation.

Meanwhile, a blank having a size of 170 mm×1000 mm was prepared from the above-described cold-rolled steel sheet. This blank was formed by hot stamping into equilateral shape steel with a base having a size of approximately 70 mm. The deflection d (mm) of the blank was measured with the method illustrated in FIG. 2.

Heating conditions before hot stamping was a temperature of 900° C. and holding times of 1 minute and 10 minutes.

Figure 3:
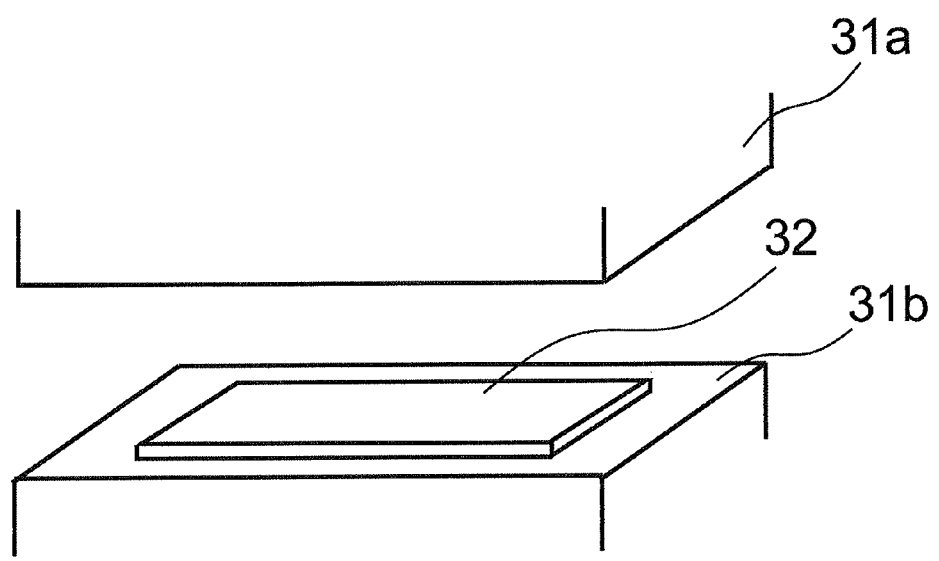
FIG. 3 is a perspective view illustrating a method of stamping a blank (steel sheet) into a plate using hot stamping.

In addition, a blank 32 having a size of 210 mm×300 mm was prepared from the above-described cold-rolled steel sheet. Using an upper die 31a and a lower die 31b of a plate stamp illustrated in FIG. 3, the blank 32 was hot-stamped under the same forming conditions (except the shape) as those of the shape steel 12 to obtain a material for measuring a tensile strength. From this material, two JIS 5 tensile test pieces were collected. In order to collect the test pieces, electrical discharge machining was performed. A tensile test was performed on the obtained test pieces to obtain a tensile strength $\sigma_B$, (average value of the two pieces).

In Table 3, steel symbols, annealing conditions, a change d/dt ($\Delta T/\Delta t$) in a rise rate of a steel sheet temperature from 300° C. to a maximum temperature S (° C.), an average value and a standard deviation of sizes of iron carbides, $\sigma_B$ (average value of the two pieces), and a deflection d are shown.

In steel sheets (Nos. 1 to 8, 10, 11, 13, and 15 to 25) obtained by annealing under annealing conditions i, iii, iv, vi, viii, and ix which satisfied the conditions of the invention, a tensile strength of approximately 1200 MPa to 1500 MPa was obtained, and a small deflection having a size of 5 mm or less was observed. On the other hand, in steel sheets (Nos. 9, 12, 14, 26, and 27) obtained by annealing under annealing conditions which did not satisfy the conditions of the invention, a deflection having a size of greater than 5 mm was observed.

Figure 4:
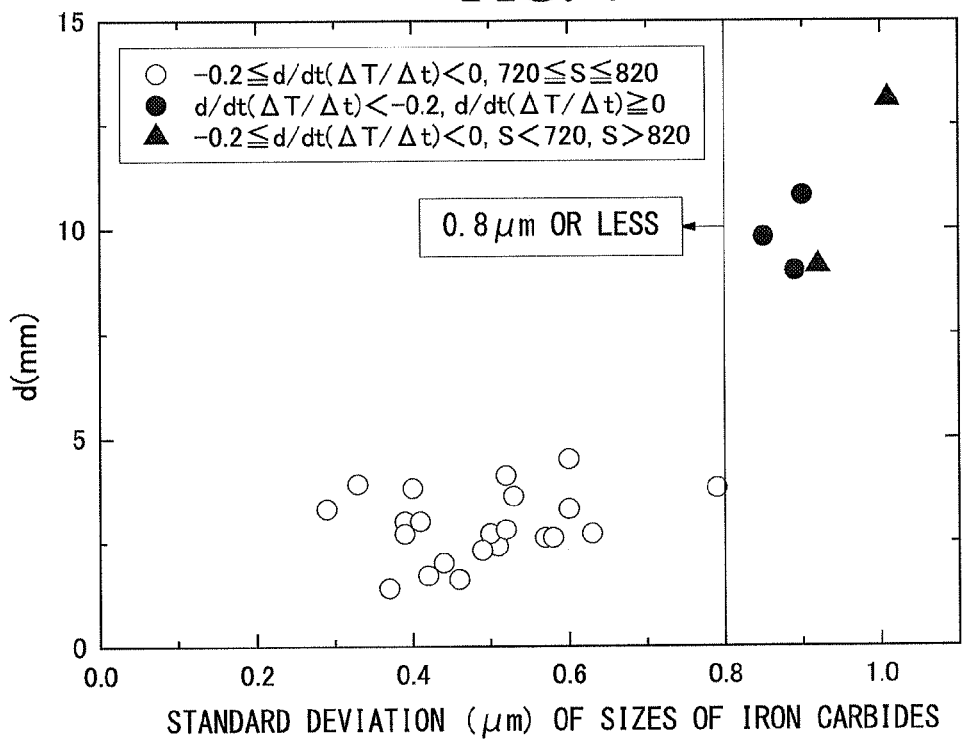
FIG. 4 is a graph illustrating a relationship between a standard deviation of sizes of iron carbides and deflection when heating conditions before hot stamping are a temperature of 900° C. and a time of 1 minute in Example 1.
Figure 5:
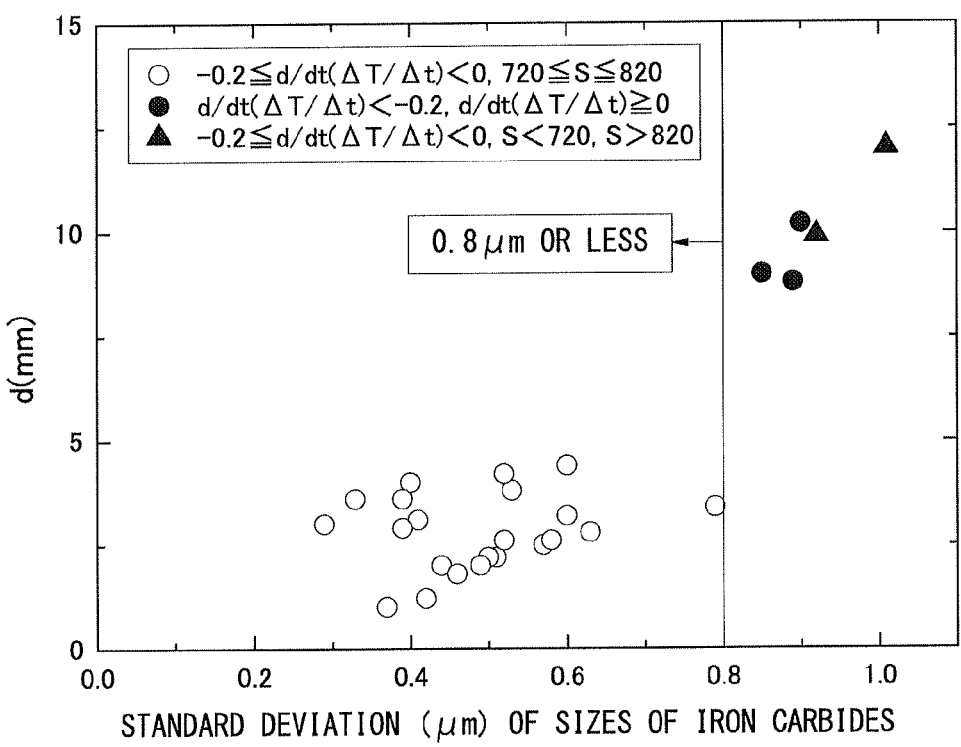
FIG. 5 is a graph illustrating a relationship between a standard deviation of sizes of iron carbides and deflection when heating conditions before hot stamping are a temperature of 900° C. and a time of 10 minute in Example 1.

As illustrated in FIG. 4 (heating conditions before hot stamping of 900° C. and a holding time of 1 minute) and FIG. 5 (heating conditions before hot stamping of 900° C. and a holding time of 10 minutes), it was obvious that the above results strongly depended on the standard deviation of sizes of iron carbides which were contained in a region from a surface to a ¼ thickness position of a steel sheet before hot stamping; and when the standard deviation of sizes of iron carbides which were contained in a region from a surface to a ¼ thickness position of a steel sheet before hot stamping was less than or equal to 8 µm (Nos. 1 to 8, 10, 11, 13, and 15 to 25; indicated by open circles), a long hot stamping member having a smaller deflection can be obtained.

On the other hand, it was obvious that, when the standard deviation was greater than 8 µm (Nos. 9, 12, 14, 26, and 27; indicated by solid circles or solid triangles), the deflection d was greater than 8 µm which was intolerable.

Figure 6:
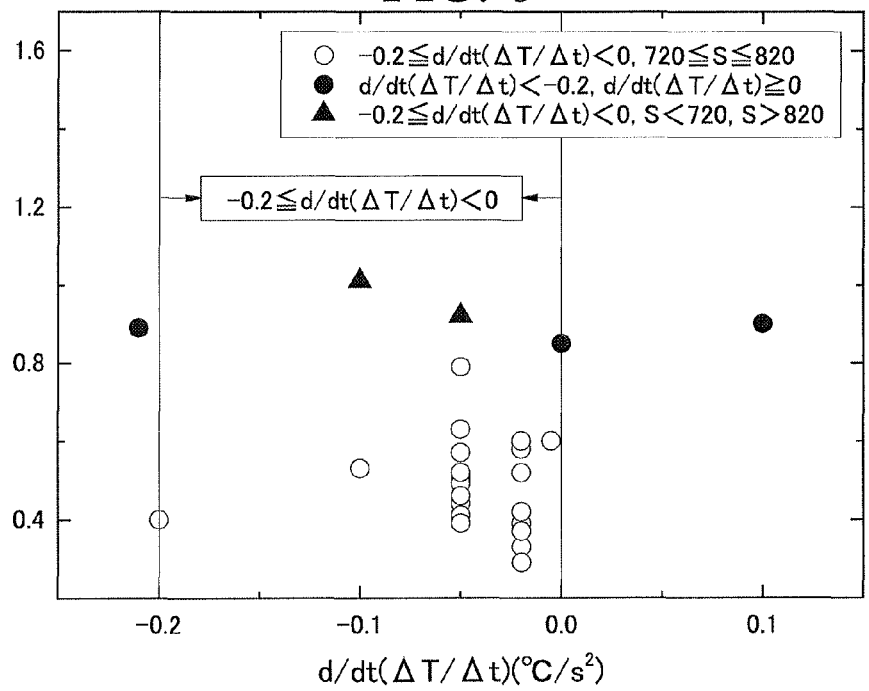
FIG. 6 is a graph illustrating a relationship between d/dt (ΔT/Δt) and a standard deviation of sizes of iron carbides in Example 1.

In addition, it was obvious that, in order to obtain a steel sheet in which a standard deviation of sizes of iron carbides which were contained in a region from a surface to a ¼ thickness position of a steel sheet before hot stamping was less than or equal to 0.8 µm, recrystallization annealing was preferably performed under conditions in which a change $d/dt$ ($\Delta T/\Delta t$) in a rise rate of a steel sheet temperature from 300° C. to a maximum temperature S (° C.) satisfied an expression of $-0.2 \leq d/dt\ (\Delta T/\Delta t) < 0$; and the maximum temperature S was 720° C. to 820° C., as indicated by open circles in FIG. 6. When $d/dt$ ($\Delta T/\Delta t$) was less than $-0.2$, or greater than or equal to 0; or when S is lower than 720° C. or higher than 820° C., as indicated by solid circles and solid triangles in the same drawing, the standard deviation of sizes of iron carbides was greater than 0.8 µm.

TABLE 1

| Steel Symbol | Chemical Components (mass %) | | | | | | | |
|---|---|---|---|---|---|---|---|---|
| | C | Si | Mn | P | S | Al | N | Others |
| a | 0.25 | 0.3 | 1.3 | 0.02 | 0.002 | 0.03 | 0.004 | Ti: 0.03, B: 0.003 |
| b | 0.22 | 0.3 | 1.2 | 0.02 | 0.002 | 0.03 | 0.003 | |
| c | 0.21 | 0.3 | 1.4 | 0.02 | 0.002 | 0.03 | 0.002 | B: 0.004 |
| d | 0.20 | 0.2 | 1.2 | 0.02 | 0.002 | 0.03 | 0.004 | Cr: 0.2, Ti: 0.02, B: 0.002 |
| e | 0.18 | 0.2 | 1.3 | 0.02 | 0.002 | 0.03 | 0.003 | Cr: 1.4, Ti: 0.02, B: 0.002 |
| f | 0.15 | 0.3 | 1.1 | 0.02 | 0.002 | 0.03 | 0.003 | Cr: 0.1, B: 0.004 |
| g | 0.12 | 0.2 | 1.3 | 0.02 | 0.002 | 0.03 | 0.003 | Ti: 0.03, Nb: 0.01, B: 0.003 |
| h | 0.10 | 0.1 | 1.0 | 0.02 | 0.002 | 0.03 | 0.003 | Cr: 0.2, Ti: 0.02, B: 0.003 |
| i | 0.23 | 0.1 | 0.6 | 0.02 | 0.002 | 0.03 | 0.003 | Cr: 0.2, Ti: 0.02, B: 0.002 |
| j | 0.26 | 0.1 | 0.3 | 0.02 | 0.002 | 0.03 | 0.003 | Cr: 0.2, Ti: 0.02, B: 0.002 |

TABLE 2

| Condition No. | $d/dt$ ($\Delta T/\Delta t$) (° C./s²) | Temperature S (° C.) | Cooling Conditions | |
|---|---|---|---|---|
| i | −0.05 | 800 | Not Held. Cooling to 670° C. at Average Cooling Rate of 6° C./s, Held at 670° C. for 10 Seconds, Air Cooling to Room Temperature | Example |
| ii | −0.05 | <u>710</u> | Same as above | Comparative Example |
| iii | −0.05 | 720 | Same as above | Example |
| iv | −0.1 | 820 | Same as above | Example |
| v | −0.1 | <u>830</u> | Same as above | Comparative Example |
| vi | −0.2 | 800 | Same as above | Example |
| vii | <u>−0.21</u> | 800 | Same as above | Comparative Example |
| viii | −0.005 | 800 | Same as above | Example |
| ix | −0.02 | 800 | Held at 800° C. for 10 Seconds, Air Cooling to Room Temperature | Example |
| x | <u>0</u> | 800 | Same as above | Comparative Example |
| xi | <u>0.1</u> | 725 | Held at 725° C. for 10 Seconds, Air Cooling to Room Temperature | Comparative Example |

Underlined items represent being out of the range of the invention.
In the condition number x, heating rate of 300° C. to 600° C. is constant at 10° C./s, and heating rate of 600° C. to 800° C. was constant at 2° C./s.

TABLE 3

| No. | Steel Symbol | Annealing Conditions | $d/dt$ ($\Delta T/\Delta t$) (° C./s²) | Average Value (µm) of Sizes of Iron Carbides | Standard Deviation (µm) of Sizes of Iron Carbides | Heating Conditions Before Hot Stamping | | | | |
|---|---|---|---|---|---|---|---|---|---|---|
| | | | | | | Held at 900° C. for 1 minute | | Held at 900° C. for 10 minutes | | |
| | | | | | | $\sigma_B$ (MPa) | d (mm) | $\sigma_B$ (MPa) | d (mm) | |
| 1 | a | i | −0.05 | 1.3 | 0.51 | 1506 | 2.4 | 1508 | 2.2 | Example |
| 2 | b | i | −0.05 | 1.2 | 0.44 | 1500 | 2.0 | 1505 | 2.0 | Example |
| 3 | c | i | −0.05 | 1.2 | 0.63 | 1493 | 2.7 | 1497 | 2.8 | Example |

TABLE 3-continued

| No. | Steel Symbol | Annealing Conditions | d/dt (ΔT/Δt) (°C./s$^2$) | Average Value (μm) of Sizes of Iron Carbides | Standard Deviation (μm) of Sizes of Iron Carbides | Heating Conditions Before Hot Stamping | | | | |
|---|---|---|---|---|---|---|---|---|---|---|
| | | | | | | Held at 900° C. for 1 minute | | Held at 900° C. for 10 minutes | | |
| | | | | | | $\sigma_B$ (MPa) | d (mm) | $\sigma_B$ (MPa) | d (mm) | |
| 4 | d | i | −0.05 | 1.2 | 0.57 | 1491 | 2.6 | 1493 | 2.5 | Example |
| 5 | e | i | −0.05 | 1.4 | 0.50 | 1502 | 2.7 | 1505 | 2.2 | Example |
| 6 | f | i | −0.05 | 1.1 | 0.49 | 1419 | 2.3 | 1425 | 2.0 | Example |
| 7 | g | i | −0.05 | 1.0 | 0.46 | 1306 | 1.6 | 1310 | 1.8 | Example |
| 8 | h | i | −0.05 | 1.5 | 0.79 | 1200 | 3.8 | 1203 | 3.4 | Example |
| 9 | a | ii | −0.05 | 1.9 | 0.92 | 1476 | 9.1 | 1502 | 9.9 | Comparative Example |
| 10 | a | iii | −0.05 | 1.3 | 0.52 | 1505 | 2.8 | 1505 | 2.6 | Example |
| 11 | a | iv | −0.1 | 1.2 | 0.53 | 1496 | 3.6 | 1499 | 3.8 | Example |
| 12 | a | v | −0.1 | 1.8 | 1.01 | 1501 | 13.1 | 1504 | 12.0 | Comparative Example |
| 13 | a | vi | −0.2 | 1.4 | 0.40 | 1504 | 3.8 | 1508 | 4.0 | Example |
| 14 | a | vii | −0.21 | 1.7 | 0.89 | 1499 | 9.0 | 1504 | 8.8 | Comparative Example |
| 15 | a | viii | −0.005 | 1.6 | 0.60 | 1502 | 3.3 | 1510 | 3.2 | Example |
| 16 | a | ix | −0.02 | 1.6 | 0.58 | 1509 | 2.6 | 1516 | 2.6 | Example |
| 17 | b | ix | −0.02 | 1.5 | 0.60 | 1508 | 4.5 | 1512 | 4.4 | Example |
| 18 | c | ix | −0.02 | 1.2 | 0.39 | 1502 | 3.0 | 1509 | 3.6 | Example |
| 19 | d | ix | −0.02 | 1.3 | 0.33 | 1504 | 3.9 | 1506 | 3.6 | Example |
| 20 | e | ix | −0.02 | 1.2 | 0.29 | 1499 | 3.3 | 1500 | 3.0 | Example |
| 21 | f | ix | −0.02 | 1.7 | 0.52 | 1491 | 4.1 | 1496 | 4.2 | Example |
| 22 | g | ix | −0.02 | 1.6 | 0.42 | 1290 | 1.7 | 1292 | 1.2 | Example |
| 23 | h | ix | −0.02 | 1.5 | 0.37 | 1209 | 1.4 | 1209 | 1.0 | Example |
| 24 | i | i | −0.05 | 1.3 | 0.41 | 1500 | 3.0 | 1501 | 3.1 | Example |
| 25 | j | i | −0.05 | 1.3 | 0.39 | 1508 | 2.7 | 1511 | 2.9 | Example |
| 26 | a | x | 0 | 1.4 | 0.85 | 1489 | 9.8 | 1503 | 9.0 | Comparative Example |
| 27 | a | xi | 0.1 | 2.0 | 0.90 | 1490 | 10.8 | 1496 | 10.2 | Comparative Example |

Underlined items represent being out of the range of the invention.

Example 2

Steel pieces (steels) having chemical components as shown in Table 4 were obtained through steelmaking and casting. These steels were treated under the same conditions as those of Example 1 to obtain hot-rolled steel sheets having a thickness of 3.0 mm. These hot-rolled steel sheets were pickled and were cold-rolled. As a result, cold-rolled steel sheets having a thickness of 1.2 mm were obtained.

These cold-rolled steel sheets were annealed for recrystallization under the conditions i, vii, and ix shown in Table 2 to obtain steel sheets for hot stamping.

Sizes of iron carbides which were contained in a region from a surface of the obtained cold-rolled steel sheet to a position which was distant from the surface of the steel sheet by 0.3 mm in the thickness direction (a ¼ thickness position of the steel sheet) were measured, and a standard deviation of the sizes of iron carbides was obtained. In addition, the above-described cold-rolled steel sheets were hot-stamped under both heating conditions of being held at 900° C. for 1 minute and for 5 minutes to obtain shape steels. Furthermore, by measuring a deflection d of each shape steel with the same method as that of Example 1, tensile test pieces were collected from the shape steel to obtain a tensile strength $\sigma_B$.

The results thereof are shown in Table 5.

In steel sheets for hot stamping obtained by recrystallization annealing under annealing conditions i and ix which satisfied the conditions of the invention, even when a steel sheet contains chemical components such as Mo, W, V, Cu, and Ni, the standard deviation of sizes of iron carbides from a surface to a ¼ thickness position of the steel sheet was less than or equal to 0.8 μm. Furthermore, in this case, it was obvious that a deflection of a long component (shape steel) was less than or equal to 5 mm irrespective of heating conditions (holding time at 900° C.) before hot stamping; and a superior hot stamping member was obtained.

On the other hand, in steel sheets obtained by recrystallization annealing under annealing conditions vii which did not satisfy the conditions of the invention, the standard deviation of sizes of iron carbides from a surface to a ¼ thickness position of the steel sheet was greater than 0.8 μm. In this case, it was obvious that a deflection of a hot stamping member was greater than 5 mm irrespective of heating conditions (holding time at 900° C.) before hot stamping; and such a steel sheet had low hot stamping formability.

TABLE 4

| Steel Symbol | Chemical Components (mass %) | | | | | | | |
|---|---|---|---|---|---|---|---|---|
| | C | Si | Mn | P | S | Al | N | Others |
| 2a | 0.35 | 0.4 | 1.0 | 0.02 | 0.004 | 0.03 | 0.004 | Cr: 0.2, Ti: 0.01, B: 0.002, Cu: 0.1, Ni: 0.1 |
| 2b | 0.31 | 0.5 | 1.3 | 0.02 | 0.004 | 0.03 | 0.004 | Cr: 0.5, Ti: 0.02, B: 0.004, Nb: 0.02, Mo: 0.2 |
| 2c | 0.28 | 0.9 | 1.7 | 0.02 | 0.004 | 0.03 | 0.004 | W: 0.2, Ni: 2.0 |
| 2d | 0.25 | 0.8 | 1.8 | 0.02 | 0.004 | 0.03 | 0.004 | Ti: 0.03, B: 0.003, Mo: 0.2, Ni: 1.0 |
| 2e | 0.22 | 0.6 | 1.6 | 0.02 | 0.004 | 0.03 | 0.003 | Mo: 0.1, W: 0.5, V: 0.5 |
| 2f | 0.21 | 0.4 | 1.4 | 0.02 | 0.004 | 0.03 | 0.002 | B: 0.005, Mo: 0.1, V: 0.5 |

TABLE 4-continued

| Steel | Chemical Components (mass %) | | | | | | | |
|---|---|---|---|---|---|---|---|---|
| Symbol | C | Si | Mn | P | S | Al | N | Others |
| 2g | 0.20 | 0.3 | 1.3 | 0.02 | 0.004 | 0.03 | 0.004 | Cr: 0.2, Tr: 0.02, Mo: 0.2, W: 0.4 |
| 2h | 0.18 | 0.3 | 1.3 | 0.02 | 0.004 | 0.03 | 0.003 | Cr: 1.4, Ti: 0.02, B: 0.0022, Mo: 0.1, V: 0.2 |

TABLE 5

| No. | Steel Symbol | Annealing Conditions | Average Value (μm) of Sizes of Iron Carbides | Standard Deviation (μm) of Sizes of Iron Carbides | Heating Conditions Before Hot Stamping | | | | |
|---|---|---|---|---|---|---|---|---|---|
| | | | | | Held at 900° C. for 1 minute | | Held at 900° C. for 5 minutes | | |
| | | | | | $\sigma_B$ (MPa) | d (mm) | $\sigma_B$ (MPa) | d (mm) | |
| 28 | 2a | i | 1.8 | 0.38 | 1794 | 3.4 | 1795 | 3.3 | Example |
| 29 | 2a | vii | 2.2 | 0.84 | 1785 | 9.9 | 1792 | 9.6 | Comparative Example |
| 30 | 2a | ix | 1.9 | 0.49 | 1794 | 2.8 | 1800 | 2.9 | Example |
| 31 | 2b | i | 1.7 | 0.26 | 1698 | 4.8 | 1703 | 4.8 | Example |
| 32 | 2b | vii | 2.4 | 1.07 | 1691 | 9.3 | 1697 | 9.0 | Comparative Example |
| 33 | 2b | ix | 1.7 | 0.27 | 1708 | 3.5 | 1710 | 3.4 | Example |
| 34 | 2c | i | 1.9 | 0.45 | 1596 | 4.5 | 1598 | 4.7 | Example |
| 35 | 2c | vii | 2.5 | 1.03 | 1580 | 10.3 | 1592 | 10.1 | Comparative Example |
| 36 | 2c | ix | 2.0 | 0.62 | 1590 | 4.2 | 1590 | 4.1 | Example |
| 37 | 2d | i | 1.6 | 0.29 | 1490 | 2.1 | 1493 | 1.8 | Example |
| 38 | 2d | vii | 2.4 | 1.26 | 1492 | 9.6 | 1504 | 9.7 | Comparative Example |
| 39 | 2d | ix | 1.9 | 0.50 | 1496 | 4.5 | 1497 | 4.4 | Example |
| 40 | 2e | i | 2.2 | 0.79 | 1492 | 3.6 | 1492 | 3.5 | Example |
| 41 | 2e | vii | 2.3 | 0.93 | 1491 | 12.2 | 1502 | 12.0 | Comparative Example |
| 42 | 2e | ix | 1.8 | 0.30 | 1510 | 4.3 | 1516 | 4.6 | Example |
| 43 | 2f | i | 1.8 | 0.22 | 1503 | 3.3 | 1507 | 3.2 | Example |
| 44 | 2f | vii | 2.6 | 1.16 | 1506 | 9.5 | 1515 | 9.5 | Comparative Example |
| 45 | 2f | ix | 2.2 | 0.19 | 1520 | 4.4 | 1521 | 4.6 | Example |
| 46 | 2g | i | 1.8 | 0.74 | 1490 | 4.2 | 1496 | 4.6 | Example |
| 47 | 2g | vii | 2.4 | 1.03 | 1493 | 14.2 | 1508 | 14.0 | Comparative Example |
| 48 | 2g | ix | 1.7 | 0.53 | 1528 | 4.1 | 1528 | 4.1 | Example |
| 49 | 2h | i | 1.6 | 0.44 | 1503 | 2.9 | 1508 | 3.0 | Example |
| 50 | 2h | vii | 2.0 | 0.83 | 1513 | 7.2 | 1514 | 7.4 | Comparative Example |
| 51 | 2h | ix | 1.8 | 0.65 | 1520 | 4.2 | 1524 | 4.2 | Example |

Underlined items represent being out of the range of the invention.

Example 3

Steel pieces (steels) having chemical components as shown in Table 6 were obtained through steelmaking and casting. These steels were treated under the same conditions as those of Example 1 to obtain hot-rolled steel sheets having a thickness of 2.5 mm. These hot-rolled steel sheets were pickled and were cold-rolled. As a result, cold-rolled steel sheets having a thickness of 1.2 mm were obtained.

Figure 7:
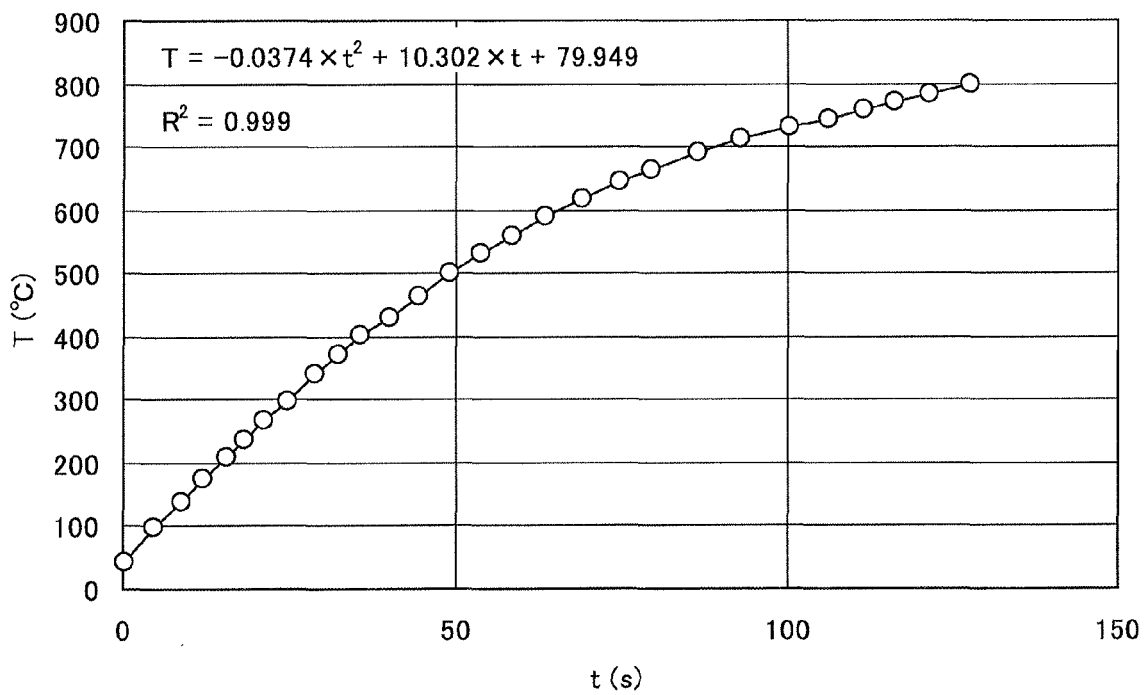
FIG. 7 is a diagram illustrating a temperature history of a steel sheet from the start of heating to a maximum temperature in Examples 3, 4, and 5.

These cold-rolled steel sheets were heated to 800° C. according to a temperature history illustrated in FIG. 7, were immediately cooled at an average cooling rate of 6.5° C./s, and were dipped in a molten Al bath (containing 10% of Si and unavoidable impurities) at 670° C. Then, the cold-rolled steel sheets were taken out from the molten Al bath after 5 seconds. The deposit amount of a plating layer was adjusted using a gas wiper, followed by air cooling to room temperature.

When the steel sheet temperature and the time after the start of annealing (time elapsed after the start of heating) are represented by T (° C.) and t (second), respectively, data regarding T and t can be read from the temperature history of FIG. 7 as shown below in Table 7. From this read data, a graph was generated using a spreadsheet software Excel (manufactured by Microsoft Corporation), and this graph was approximated by a polynomial of the second degree. As a result, an approximation expression illustrated in FIG. 7 (T=−0.0374×t$^2$+10.302×t+79.949) was obtained. By rounding off each coefficient of this approximation expression, a relationship between T and t can be defined as T=−0.037t$^2$+10.3t+80. Therefore, d/dt (ΔT/Δt) was −0.074.

In addition, as illustrated in FIG. 7, a coefficient of determination $R^2$ of the obtained approximation expression was 0.999. Like this example, d/dt (ΔT/Δt) used in the invention may be a value which is two times a coefficient of t$^2$ (coefficient of a variable of the second degree) when a temperature is read at a time interval (wherein greater than 0 seconds) of 10 seconds or shorter or 5 seconds or shorter from a temperature history during the heating of the recrystallization annealing process and then an approximation curve (polynomial approximation curve of the second degree) is determined such that a coefficient of determination $R^2$ is greater than or equal to 0.99.

In the obtained steel sheet, sizes of iron carbides which were contained in a region from a boundary between an inner layer (reaction layer of Al and Fe) of an Al plating layer and the steel sheet to a position which is distant from the boundary by 0.3 mm in the through-thickness direction were measured, and a standard deviation of the sizes of iron carbides was obtained. During the measurement of iron carbides, the thickness (total thickness of two layers) of the Al plating layer was measured. Furthermore, with the same method as that of Example 1, the steel sheet was hot-stamped into a shape steel and a plate to measure a deflection d and a tensile strength $\sigma_B$. In this case, heating conditions before hot stamping were being held at 900° C. for 1 minute.

The results thereof are shown in Table 8.

In all Examples (Nos. 52 to 71), a hot stamping member having a deflection size of 5 mm or less was obtained. However, in Examples Nos. 56, 61, 66, and 71 in which the thickness of the Al plating layer was greater than 50 μm, galling was highly frequently observed in a region of a shape steel from a corner portion to an end portion. In examples in which the thickness of the Al plating layer was less than or equal to 50 μm, galling was not observed. Accordingly, when an Al plating layer is formed on the surface of the steel sheet, an upper limit of the thickness of the Al plating layer is preferably less than or equal to 50 μm from the viewpoint of plating quality. In Table 8, for the quality of the Al plating layer, examples in which galling was not observed in the Al plating layer were evaluated as "A"; and examples in which galling was observed in the Al plating layer were evaluated as "B".

TABLE 6

| Steel Symbol | Chemical Components (mass %) | | | | | | | |
|---|---|---|---|---|---|---|---|---|
| | C | Si | Mn | P | S | Al | N | Others |
| 3a | 0.34 | 0.09 | 1.8 | 0.02 | 0.004 | 0.04 | 0.002 | Cr: 0.2, Mo: 0.2, Cu: 0.1, Ni: 0.05 |
| 3b | 0.26 | 0.18 | 1.4 | 0.02 | 0.004 | 0.04 | 0.002 | Cr: 0.002, Ti: 0.02, B: 0.003, Mo: 0.2, W: 0.1, V: 0.1 |
| 3c | 0.23 | 0.12 | 1.3 | 0.01 | 0.008 | 0.03 | 0.003 | Cr: 0.13, Ti: 0.03, Nb: 0.02, B: 0.002 |
| 3d | 0.13 | 0.33 | 1.0 | 0.01 | 0.008 | 0.03 | 0.003 | B: 0.0005 |

TABLE 7

| t (s) | T (° C.) |
|---|---|
| 0.32 | 42.99 |
| 4.68 | 98.13 |
| 8.76 | 138.17 |
| 12.11 | 174.93 |
| 15.46 | 208.73 |
| 18.16 | 236.3 |
| 21.19 | 266.82 |
| 24.58 | 297.67 |
| 28.94 | 340.66 |
| 32.32 | 371.18 |
| 35.68 | 402.03 |
| 40.04 | 429.6 |
| 44.43 | 463.41 |
| 49.15 | 500.16 |
| 53.87 | 530.69 |
| 58.56 | 558.25 |
| 63.64 | 589.1 |
| 69.01 | 616.67 |
| 74.74 | 644.24 |
| 79.46 | 662.62 |
| 86.52 | 690.19 |
| 92.9 | 711.85 |
| 100.32 | 730.23 |
| 106.05 | 742.37 |
| 111.42 | 757.79 |
| 116.14 | 769.94 |
| 121.55 | 782.41 |
| 127.6 | 797.51 |

TABLE 8

| No. | Steel Symbol | Average Value (μm) of Sizes of Iron Carbides | Standard Deviation (μm) of Sizes of Iron Carbides | $\sigma_B$ (MPa) | d (mm) | Thickness of Al Plating Layer (μm) | Quality of Al Plating Layer | |
|---|---|---|---|---|---|---|---|---|
| 52 | 3a | 2.0 | 0.51 | 1784 | 3.3 | 16.1 | A | Example |
| 53 | 3a | 2.0 | 0.48 | 1789 | 3.5 | 32.2 | A | Example |
| 54 | 3a | 2.0 | 0.42 | 1801 | 3.2 | 33.9 | A | Example |
| 55 | 3a | 2.1 | 0.66 | 1792 | 4.0 | 48.8 | A | Example |
| 56 | 3a | 2.0 | 0.52 | 1790 | 3.8 | 51.0 | B | Example |
| 57 | 3b | 2.0 | 0.47 | 1516 | 3.5 | 15.0 | A | Example |
| 58 | 3b | 1.9 | 0.39 | 1520 | 2.9 | 19.7 | A | Example |
| 59 | 3b | 2.0 | 0.63 | 1524 | 4.1 | 34.9 | A | Example |
| 60 | 3b | 2.1 | 0.68 | 1522 | 4.1 | 49.5 | A | Example |
| 61 | 3b | 2.0 | 0.42 | 1534 | 3.4 | 54.8 | B | Example |

TABLE 8-continued

| No. | Steel Symbol | Average Value (μm) of Sizes of Iron Carbides | Standard Deviation (μm) of Sizes of Iron Carbides | $\sigma_B$ (MPa) | d (mm) | Thickness of Al Plating Layer (μm) | Quality of Al Plating Layer | |
|---|---|---|---|---|---|---|---|---|
| 62 | 3c | 1.8 | 0.35 | 1502 | 2.9 | 14.9 | A | Example |
| 63 | 3c | 1.8 | 0.32 | 1509 | 3.7 | 20.2 | A | Example |
| 64 | 3c | 1.9 | 0.74 | 1513 | 4.8 | 34.5 | A | Example |
| 65 | 3c | 1.9 | 0.76 | 1519 | 4.9 | 49.0 | A | Example |
| 66 | 3c | 1.9 | 0.69 | 1524 | 4.4 | 55.9 | B | Example |
| 67 | 3d | 1.7 | 0.55 | 1318 | 4.1 | 17.0 | A | Example |
| 68 | 3d | 1.8 | 0.67 | 1326 | 4.2 | 20.2 | A | Example |
| 69 | 3d | 1.7 | 0.52 | 1320 | 4.0 | 30.2 | A | Example |
| 70 | 3d | 1.7 | 0.50 | 1314 | 3.9 | 42.2 | A | Example |
| 71 | 3d | 1.7 | 0.44 | 1310 | 3.7 | 53.1 | B | Example |

Example 4

Steel pieces (steels) having chemical components as shown in Table 6 were obtained through steelmaking and casting. These steels were treated under the same conditions as those of Example 1 to obtain hot-rolled steel sheets having a thickness of 2.5 mm. These hot-rolled steel sheets were pickled and were cold-rolled. As a result, cold-rolled steel sheets having a thickness of 1.2 mm were obtained.

These cold-rolled steel sheets were heated to 800° C. according to the same temperature history as that of Example 3, were immediately cooled at an average cooling rate of 6.5° C./s, and were dipped in a molten Zn bath (containing 0.15% of Al and unavoidable impurities) at 460° C. Then, the cold-rolled steel sheets were taken out from the molten Zn bath after 3 seconds. The deposit amount of a plating layer was adjusted using a gas wiper, followed by air cooling to room temperature.

In the obtained steel sheet, sizes of iron carbides which were contained in a region from a boundary between an inner layer (reaction layer of Al and Fe) of a Zn plating layer and the steel sheet to a position which is distant from the boundary by 0.3 mm in the through-thickness direction were measured, and a standard deviation of the sizes of iron carbides was obtained. During the measurement of iron carbides, the thickness (total thickness of two layers) of the Zn plating layer was measured. Furthermore, with the same method as that of Example 1, the steel sheet was hot-stamped into a shape steel and a plate to measure a deflection d and a tensile strength $\sigma_B$. In this case, heating conditions before hot stamping were two conditions of <1> heating the steel sheet to 880° C. and holding the temperature for 5 seconds, followed by air cooling to 700° C.; and <2> holding the temperature at 900° C. for 1 minute.

The results thereof are shown in Table 9.

In all Examples (Nos. 72 to 91), a hot stamping member having a deflection size of 5 mm or less was obtained irrespective of heating conditions before hot stamping. However, in Examples Nos. 76, 81, 86, and 91 in which the thickness of the Zn plating layer was greater than 30 μm, the adhesion of Zn was highly frequently observed in a die. In examples in which the thickness of the Zn plating layer was less than or equal to 30 μm, adhesion was not observed. Accordingly, when a Zn plating layer is formed on the surface of the steel sheet, an upper limit of the thickness of the Zn plating layer is preferably less than or equal to 30 μm from the viewpoint of plating quality. In Table 9, for the quality of the Zn plating layer, examples in which Zn did not adhere to the die were evaluated as "A"; and examples in which Zn adhered to the die were evaluated as "B".

TABLE 9

| No. | Steel Symbol | Average Value (μm) of Sizes of Iron Carbides | Standard Deviation (μm) of Sizes of Iron Carbides | Heating Conditions Before Hot Stamping | | | | Thickness (μm) of Zn Plating Layer | Quality of Zn Plating Layer | |
|---|---|---|---|---|---|---|---|---|---|---|
| | | | | <1> | | <2> | | | | |
| | | | | $\sigma_B$ (MPa) | d (mm) | $\sigma_B$ (MPa) | d (mm) | | | |
| 72 | 3a | 2.0 | 0.62 | 1784 | 3.9 | 1788 | 3.6 | 6.0 | A | Example |
| 73 | 3a | 2.0 | 0.39 | 1788 | 2.9 | 1795 | 3.1 | 12.6 | A | Example |
| 74 | 3a | 2.0 | 0.44 | 1803 | 4.1 | 1809 | 4.0 | 23.9 | A | Example |
| 75 | 3a | 2.1 | 0.51 | 1795 | 4.2 | 1796 | 4.2 | 28.7 | A | Example |
| 76 | 3a | 2.0 | 0.66 | 1793 | 4.4 | 1799 | 4.1 | 31.1 | B | Example |
| 77 | 3b | 2.0 | 0.55 | 1516 | 3.3 | 1520 | 3.6 | 11.0 | A | Example |
| 78 | 3b | 1.9 | 0.39 | 1523 | 3.7 | 1533 | 3.6 | 19.6 | A | Example |
| 79 | 3b | 2.0 | 0.77 | 1534 | 2.6 | 1535 | 2.9 | 24.8 | A | Example |
| 80 | 3b | 2.1 | 0.46 | 1532 | 4.3 | 1536 | 3.9 | 29.2 | A | Example |
| 81 | 3b | 2.0 | 0.37 | 1548 | 3.6 | 1555 | 3.8 | 32.7 | B | Example |
| 82 | 3c | 1.8 | 0.51 | 1518 | 3.7 | 1527 | 3.5 | 11.3 | A | Example |
| 83 | 3c | 1.8 | 0.66 | 1537 | 5.0 | 1540 | 4.2 | 17.4 | A | Example |
| 84 | 3c | 1.9 | 0.58 | 1524 | 4.2 | 1524 | 4.4 | 19.8 | A | Example |
| 85 | 3c | 1.9 | 0.57 | 1539 | 4.7 | 1547 | 4.3 | 29.3 | A | Example |
| 86 | 3c | 1.9 | 0.77 | 1548 | 3.9 | 1549 | 3.8 | 32.5 | B | Example |
| 87 | 3d | 1.7 | 0.46 | 1336 | 3.7 | 1345 | 3.2 | 11.0 | A | Example |
| 88 | 3d | 1.8 | 0.42 | 1342 | 4.4 | 1344 | 4.1 | 17.0 | A | Example |

TABLE 9-continued

| No. | Steel Symbol | Average Value (µm) of Sizes of Iron Carbides | Standard Deviation (µm) of Sizes of Iron Carbides | Heating Conditions Before Hot Stamping | | | | Thickness (µm) of Zn Plating Layer | Quality of Zn Plating Layer | |
|---|---|---|---|---|---|---|---|---|---|---|
| | | | | <1> | | <2> | | | | |
| | | | | $\sigma_B$ (MPa) | d (mm) | $\sigma_B$ (MPa) | d (mm) | | | |
| 89 | 3d | 1.7 | 0.32 | 1319 | 4.9 | 1322 | 4.3 | 20.4 | A | Example |
| 90 | 3d | 1.7 | 0.69 | 1320 | 4.2 | 1320 | 4.2 | 28.9 | A | Example |
| 91 | 3d | 1.7 | 0.70 | 1341 | 3.5 | 1349 | 3.4 | 33.0 | B | Example |

<1> Heating the steel sheet to 880° C. and holding the temperature for 5 seconds, followed by air cooling to 700° C.
<2> Holding the temperature at 900° C. for 1 minute Example 5

Steel pieces (steels) having chemical components as shown in Table 6 were obtained through steelmaking and casting. These steels were treated under the same conditions as those of Example 1 to obtain hot-rolled steel sheets having a thickness of 2.5 mm. These hot-rolled steel sheets were pickled and were cold-rolled. As a result, cold-rolled steel sheets having a thickness of 1.2 mm were obtained.

These cold-rolled steel sheets were heated to 800° C. according to the same temperature history as that of Example 3, were immediately cooled at an average cooling rate of 6.5° C./s, and were dipped in a molten Zn bath (containing 0.13% of Al, 0.03% of Fe, and unavoidable impurities) at 460° C. Then, the cold-rolled steel sheets were taken out from the molten Zn bath after 3 seconds. The deposit amount of a plating layer was adjusted using a gas wiper. Then the cold-rolled steel sheets were heated to 480° to form a Zn—Fe alloy layer thereon, followed by air cooling to room temperature.

In the obtained steel sheet, sizes of iron carbides which were contained in a region from a boundary between the innermost layer (reaction layer of Zn and Fe) of a Zn—Fe alloy layer and the steel sheet to a position which is distant from the boundary by 0.3 mm in the through-thickness direction were measured, and a standard deviation of the sizes of iron carbides was obtained. During the measurement of iron carbides, the total thickness of the Zn—Fe alloy layer (including 4 layers) was measured. Furthermore, with the same method as that of Example 1, the steel sheet was hot-stamped into a shape steel and a plate to measure a deflection d and a tensile strength $\sigma_B$. In this case, heating conditions before hot stamping were two conditions of <1> heating the steel sheet to 880° C. and holding the temperature for 5 seconds, followed by air cooling to 700° C.; and <2> holding the temperature at 900° C. for 1 minute.

The results thereof are shown in Table 10.

In all Examples (Nos. 92 to 111), a hot stamping member having a deflection size of 5 mm or less was obtained irrespective of heating conditions before hot stamping. However, in Examples Nos. 96, 101, 106, and 111 in which the thickness of the Zn—Fe alloy layer was greater than 45 small cracks were generated on the alloy layer after hot stamping. In examples in which the thickness of the Zn—Fe alloy layer was less than or equal to 45 µm, no small cracks were generated. Accordingly, when a Zn—Fe alloy layer is formed on the surface of the steel sheet, an upper limit of the thickness of the Zn—Fe alloy layer is preferably less than or equal to 45 µm from the viewpoint of plating quality. In Table 10, for the quality of the Zn—Fe alloy layer, examples in which no small cracks were generated on the Zn—Fe alloy layer were evaluated as "A"; and examples in which small cracks were generated on the Zn—Fe alloy layer were evaluated as "B".

TABLE 10

| No. | Steel Symbol | Average Value (µm) of Sizes of Iron Carbides | Standard Deviation (µm) of Sizes of Iron Carbides | Heating Conditions Before Hot Stamping | | | | Thickness (µm) of Zn—Fe Plating Layer | Quality of Zn—Fe Plating Layer | |
|---|---|---|---|---|---|---|---|---|---|---|
| | | | | <1> | | <2> | | | | |
| | | | | $\sigma_B$ (MPa) | d (mm) | $\sigma_B$ (MPa) | d (mm) | | | |
| 92 | 3a | 2.0 | 0.42 | 1773 | 4.2 | 1777 | 4.3 | 15.0 | A | Example |
| 93 | 3a | 2.0 | 0.44 | 1777 | 4.4 | 1778 | 4.6 | 20.2 | A | Example |
| 94 | 3a | 2.0 | 0.39 | 1802 | 3.2 | 1815 | 3.0 | 31.1 | A | Example |
| 95 | 3a | 2.1 | 0.73 | 1786 | 3.4 | 1788 | 3.0 | 39.9 | A | Example |
| 96 | 3a | 2.0 | 0.79 | 1772 | 2.9 | 1775 | 3.5 | 46.0 | B | Example |
| 97 | 3b | 2.0 | 0.66 | 1505 | 3.9 | 1506 | 4.1 | 15.6 | A | Example |
| 98 | 3b | 1.9 | 0.41 | 1519 | 4.1 | 1522 | 4.0 | 21.7 | A | Example |
| 99 | 3b | 2.0 | 0.33 | 1513 | 3.3 | 1517 | 3.6 | 39.3 | A | Example |
| 100 | 3b | 2.1 | 0.68 | 1502 | 4.8 | 1502 | 4.2 | 44.7 | A | Example |
| 101 | 3b | 2.0 | 0.47 | 1518 | 4.6 | 1529 | 4.4 | 49.8 | B | Example |
| 102 | 3c | 1.8 | 0.45 | 1506 | 3.7 | 1509 | 3.9 | 14.5 | A | Example |
| 103 | 3c | 1.8 | 0.53 | 1503 | 4.2 | 1513 | 4.0 | 20.7 | A | Example |
| 104 | 3c | 1.9 | 0.55 | 1500 | 4.8 | 1507 | 4.0 | 34.7 | A | Example |
| 105 | 3c | 1.9 | 0.59 | 1506 | 5.0 | 1508 | 4.2 | 42.3 | A | Example |
| 106 | 3c | 1.9 | 0.67 | 1510 | 4.3 | 1522 | 4.3 | 45.3 | B | Example |
| 107 | 3d | 1.7 | 0.60 | 1307 | 3.3 | 1309 | 3.9 | 15.1 | A | Example |
| 108 | 3d | 1.8 | 0.50 | 1313 | 3.6 | 1320 | 3.8 | 18.0 | A | Example |

TABLE 10-continued

| Steel No. | Steel Symbol | Average Value (μm) of Sizes of Iron Carbides | Standard Deviation (μm) of Sizes of Iron Carbides | Heating Conditions Before Hot Stamping <1> σ_B (MPa) | <1> d (mm) | <2> σ_B (MPa) | <2> d (mm) | Thickness (μm) of Zn—Fe Plating Layer | Quality of Zn—Fe Plating Layer | |
|---|---|---|---|---|---|---|---|---|---|---|
| 109 | 3d | 1.7 | 0.44 | 1320 | 3.8 | 1329 | 3.4 | 30.1 | A | Example |
| 110 | 3d | 1.7 | 0.70 | 1314 | 4.4 | 1314 | 4.4 | 42.8 | A | Example |
| 111 | 3d | 1.7 | 0.73 | 1310 | 4.8 | 1313 | 4.7 | 46.6 | B | Example |

<1> Heating the steel sheet to 880° C. and holding the temperature for 5 seconds, followed by air cooling to 700° C.
<2> Holding the temperature at 900° C. for 1 minute

INDUSTRIAL APPLICABILITY

Provided are a steel sheet for a hot stamping member capable of reducing a deflection which easily occurs when a long component is manufactured by hot stamping; and a method of producing the same.

DESCRIPTION OF REFERENCE NUMERALS AND SIGNS

11: BLANK (STEEL SHEET)
12: SHAPE STEEL
21: SURFACE PLATE
31a: UPPER DIE
31b: LOWER DIE
32: BLANK (STEEL SHEET)
L: LENGTH
W: WIDTH
d: DEFLECTION

The invention claimed is:

1. A steel sheet for producing a hot stamping member, the steel sheet comprising, as a chemical composition:
 0.10 mass % to 0.35 mass % of C;
 0.01 mass % to 1.0 mass % of Si;
 0.3 mass % to 2.3 mass % of Mn;
 0.01 mass % to 0.5 mass % of Al;
 limited to 0.03 mass % or less of P;
 limited to 0.02 mass % or less of S;
 limited to 0.1 mass % or less of N; and
 a balance of Fe and unavoidable impurities,
 wherein a standard deviation of diameters of iron carbides which are contained in a region from a surface to a ¼ thickness position of the steel sheet is less than or equal to 0.8 μm and an average value of a size of the iron carbides which are contained in the region from the surface to the ¼ thickness position of the steel sheet is 1.0 μm or more and 2.0 μm or less.

2. The steel sheet for producing a hot stamping member according to claim 1,
 wherein the chemical composition further contains one or more selected from the group consisting of
 0.01 mass % to 2.0 mass % of Cr;
 0.001 mass % to 0.5 mass % of Ti;
 0.001 mass % to 0.5 mass % of Nb;
 0.0005 mass % to 0.01 mass % of B;
 0.01 mass % to 1.0 mass % of Mo;
 0.01 mass % to 0.5 mass % of W;
 0.01 mass % to 0.5 mass % of V;
 0.01 mass % to 1.0 mass % of Cu; and
 0.01 mass % to 5.0 mass % of Ni.

3. The steel sheet for producing a hot stamping member according to claim 2,
 wherein an Al plating layer having a plating thickness of 50 μm or less is formed on the surface.

4. The steel sheet for producing a hot stamping member according to claim 2,
 wherein a Zn plating layer having a plating thickness of 30 μm or less is formed on the surface.

5. The steel sheet for producing a hot stamping member according to claim 2,
 wherein a Zn—Fe alloy layer having a plating thickness of 45 μm or less is formed on the surface.

6. The steel sheet for producing a hot stamping member according to claim 1,
 wherein an Al plating layer having a plating thickness of 50 μm or less is formed on the surface.

7. The steel sheet for producing a hot stamping member according to claim 1,
 wherein a Zn plating layer having a plating thickness of 30 μm or less is formed on the surface.

8. The steel sheet for producing a hot stamping member according to claim 1,
 wherein a Zn—Fe alloy layer having a plating thickness of 45 μm or less is formed on the surface.

9. A method of producing a steel sheet for a hot stamping member according to claim 1, the method comprising:
 performing a recrystallization annealing process in which a cold-rolled steel sheet is heated such that a change $d/dt\,(\Delta T/\Delta t;\ ^\circ C./s^2)$ in a rise rate of a steel sheet temperature from 300° C. to a maximum temperature S satisfies following expression 1 and such that the maximum temperature S is 720° C. to 820° C., wherein:
 T represents the steel sheet temperature (° C.), t represents time (second), and ΔT/Δt represents the rise rate (° C./s) of the steel sheet temperature for a time Δt (second) during the heating of the recrystallization annealing process; and
 the cold-rolled steel sheet contains, as a chemical composition,
 0.10 mass % to 0.35 mass % of C;
 0.01 mass % to 1.0 mass % of Si;
 0.3 mass % to 2.3 mass % of Mn;
 0.01 mass % to 0.5 mass % of Al;
 limited to 0.03 mass % or less of P;
 limited to 0.02 mass % or less of S;
 limited to 0.1 mass % or less of N; and
 a balance of Fe and unavoidable impurities, $$-0.20 \leq d/dt(\Delta T/\Delta t) < 0 \qquad \text{(Expression 1)}.$$

10. The method of producing a steel sheet for a hot stamping member according to claim 9,
wherein the chemical composition further contains one or more selected from the group consisting of
0.01 mass % to 2.0 mass % of Cr;
0.001 mass % to 0.5 mass % of Ti;
0.001 mass % to 0.5 mass % of Nb;
0.0005 mass % to 0.01 mass % of B;
0.01 mass % to 1.0 mass % of Mo;
0.01 mass % to 0.5 mass % of W;
0.01 mass % to 0.5 mass % of V;
0.01 mass % to 1.0 mass % of Cu; and
0.01 mass % to 5.0 mass % of Ni.

11. The method of producing a steel sheet for a hot stamping member according to claim 9,
wherein the change d/dt ($\Delta T/\Delta t$) is two times a coefficient of a variable of second degree when a temperature is read at a time interval of 10 seconds or shorter from a temperature history during the heating of the recrystallization annealing process and then a polynomial approximation curve of the second degree is determined such that a coefficient of determination $R^2$ is greater than or equal to 0.99.

12. The method of producing a steel sheet for a hot stamping member according to claim 9, after the recrystallization annealing process, further comprising:
dipping the cold-rolled steel sheet in an Al bath to form an Al plating layer having a plating thickness of 50 μm or less on a surface of the cold-rolled steel sheet.

13. The method of producing a steel sheet for a hot stamping member according to claim 9, after the recrystallization annealing process, further comprising:
dipping the cold-rolled steel sheet in a Zn bath to form a Zn plating layer having a plating thickness of 30 μm or less on a surface of the cold-rolled steel sheet.

14. The method of producing a steel sheet for a hot stamping member according to claim 9, after the recrystallization annealing process, further comprising:
dipping the cold-rolled steel sheet in a Zn bath to form a Zn plating layer on a surface of the cold-rolled steel sheet; and
heating the cold-rolled steel sheet to 600° C. or lower to form a Zn—Fe alloy layer having a plating thickness of 45 μm or less on a surface of the cold-rolled steel sheet.

15. The method of producing a steel sheet for a hot stamping member according to claim 10,
wherein the change d/dt ($\Delta T/\Delta t$) is two times a coefficient of a variable of second degree when a temperature is read at a time interval of 10 seconds or shorter from a temperature history during the heating of the recrystallization annealing process and then a polynomial approximation curve of the second degree is determined such that a coefficient of determination $R^2$ is greater than or equal to 0.99.

16. The method of producing a steel sheet for a hot stamping member according to claim 10, after the recrystallization annealing process, further comprising:
dipping the cold-rolled steel sheet in an Al bath to form an Al plating layer having a plating thickness of 50 μm or less on a surface of the cold-rolled steel sheet.

17. The method of producing a steel sheet for a hot stamping member according to claim 10, after the recrystallization annealing process, further comprising:
dipping the cold-rolled steel sheet in a Zn bath to form a Zn plating layer having a plating thickness of 30 μm or less on a surface of the cold-rolled steel sheet.

18. The method of producing a steel sheet for a hot stamping member according to claim 10, after the recrystallization annealing process, further comprising:
dipping the cold-rolled steel sheet in a Zn bath to form a Zn plating layer on a surface of the cold-rolled steel sheet; and
heating the cold-rolled steel sheet to 600° C. or lower to form a Zn—Fe alloy layer having a plating thickness of 45 μm or less on a surface of the cold-rolled steel sheet.

\* \* \* \* \*

UNITED STATES PATENT AND TRADEMARK OFFICE
CERTIFICATE OF CORRECTION

PATENT NO. : 9,617,624 B2
APPLICATION NO. : 14/112414
DATED : April 11, 2017
INVENTOR(S) : Hiroyuki Tanahashi et al.

It is certified that error appears in the above-identified patent and that said Letters Patent is hereby corrected as shown below:

On the Title Page

At Item (73), Assignee, change "NIPPON STEEL SUMITOMO METAL CORPORATION, Tokyo (JP)" to read --NIPPON STEEL & SUMITOMO METAL CORPORATION, Tokyo (JP)--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*